United States Patent
Sekiguchi et al.

(10) Patent No.: US 10,669,060 B2
(45) Date of Patent: Jun. 2, 2020

(54) CONTAINER OF PUNCTURE REPAIR AGENT

(71) Applicant: THE YOKOHAMA RUBBER CO., LTD., Tokyo (JP)

(72) Inventors: Takumi Sekiguchi, Hiratsuka (JP); Ryosuke Oki, Nagoya (JP); Daisuke Yamazaki, Fujisawa (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 87 days.

(21) Appl. No.: 14/418,205

(22) PCT Filed: Jul. 23, 2013

(86) PCT No.: PCT/JP2013/069893
§ 371 (c)(1),
(2) Date: Jan. 29, 2015

(87) PCT Pub. No.: WO2014/034328
PCT Pub. Date: Mar. 6, 2014

(65) Prior Publication Data
US 2015/0158620 A1    Jun. 11, 2015

(30) Foreign Application Priority Data

Aug. 31, 2012 (JP) .................................. 2012-191651
Aug. 31, 2012 (JP) .................................. 2012-191653

(51) Int. Cl.
*B65D 1/32* (2006.01)
*B65D 1/02* (2006.01)
(Continued)

(52) U.S. Cl.
CPC .......... *B65D 1/0223* (2013.01); *B29C 73/025* (2013.01); *B29C 73/166* (2013.01); *B65D 1/32* (2013.01)

(58) Field of Classification Search
CPC . B65D 23/0878; B65D 79/005; G01F 11/082; A47K 5/122
(Continued)

(56) References Cited

U.S. PATENT DOCUMENTS

| | | | | |
|---|---|---|---|---|
| 5,337,924 A | * | 8/1994 | Dickie | ...................... B65D 1/32 |
| | | | | 215/383 |
| 2003/0024596 A1 | | 2/2003 | Kojima et al. | |
| 2009/0294458 A1 | * | 12/2009 | Tanaka | .................... B29C 55/06 |
| | | | | 220/694 |

FOREIGN PATENT DOCUMENTS

| | | | | |
|---|---|---|---|---|
| DE | 102012214111 A1 | * | 5/2014 | .............. A61J 1/067 |
| JP | S46-30629 Y | | 10/1971 | |

(Continued)

OTHER PUBLICATIONS

DE_102012214111_translation.pdf.*
(Continued)

*Primary Examiner* — Allan D Stevens
(74) *Attorney, Agent, or Firm* — Oliff PLC

(57) ABSTRACT

A container of a puncture repair agent includes: a bottomed cylindrical container body to store the puncture repair agent; and a mouth portion provided on the container body, from which the puncture repair agent is pushed out by pressing the container body, wherein the container body is hollow molded into a flat shape and includes a barrel portion, wherein the barrel portion includes a pair of narrow portions facing in a major axis direction, and a pair of wide portions facing in a minor axis direction, and wherein each of the pair of wide portions is provided with a pressing recessed portion capable of being recessed in a concave curved surface shape toward inside of the barrel portion.

10 Claims, 19 Drawing Sheets

(51) Int. Cl.
  *B29C 73/16* (2006.01)
  *B29C 73/02* (2006.01)
(58) Field of Classification Search
  USPC ......... 141/329, 330; 215/381, 382, 383, 384
  See application file for complete search history.

(56) References Cited

FOREIGN PATENT DOCUMENTS

| | | |
|---|---|---|
| JP | S48-104755 U1 | 12/1973 |
| JP | S49-144646 U1 | 12/1974 |
| JP | S54-106956 U | 7/1979 |
| JP | H11-115954 A | 4/1999 |
| JP | 2001-120638 A | 5/2001 |
| JP | 2002-189415 A | 7/2002 |
| JP | 2003-026217 A | 1/2003 |
| JP | 2003-127242 A | 5/2003 |
| JP | 2003-276719 A | 10/2003 |
| JP | 2004-123190 A | 4/2004 |
| JP | 2005-170486 A | 6/2005 |
| JP | 2006-062715 A | 3/2006 |
| JP | 3875523 B2 | 1/2007 |
| JP | 2009-248982 A | 10/2009 |
| WO | WO 2012171753 A1 * 12/2012 | ........... B65D 1/0223 |

OTHER PUBLICATIONS

Translation of Mar. 3, 2015 International Preliminary Report on Patentability issued in International Patent Application No. PCT/JP2013/069893.
Nov. 5, 2013 Search Report issued in International Application No. PCT/JP2013/069893.
Jul. 29, 2013 Office Action issued in Japanese Application No. 2012-191653.
Mar. 25, 2014 Office Action issued in Japanese Application No. 2012-191653.
Mar. 28, 2016 Office Action issued in Chinese Patent Application No. 201380043257.9.
Aug. 12, 2016 Office Action issued in Chinese Application No. 2013-80043257.9.

* cited by examiner

Prior Art

Prior Art

Prior Art

CONTAINER OF PUNCTURE REPAIR AGENT

TECHNICAL FIELD

The present invention relates to a container of a puncture repair agent, in particular, to the container of the puncture repair agent to push out the puncture repair agent from the container by pressing the container.

BACKGROUND ART

In recent years, when a tire is punctured, a puncture repair kit to boost the tire up to a specified air pressure is widely used, after closing the puncture hole in emergency basis by injecting the puncture repair agent into the tire. This puncture repair kit can repair the punctured tire without replacing the tire. Conventionally, with regard to such a puncture repair kit, various techniques have been proposed (for example, refer to Patent Literature 1).

The sealing pump-up device of the tire described in the Patent Literature 1 is provided with an elastically deformable liquid bottle. In the liquid bottle, a sealant (a puncture repair agent) is housed. When repairing a punctured tire, by pressing and compressing the liquid bottle, the sealant is pushed out from the liquid bottle and is injected into the tire through a supply pipe.

FIG. 19 is a diagram illustrating the basic configuration of the liquid bottle of the Patent Literature 1. As illustrated in FIGS. 19A and 19B, in the liquid bottle 100, the cross-section of the barrel portion 101 is formed in an elliptical shape. By this, it is intended to reduce the pressure required to push out the sealant 102. That is, since the user can press a large-diameter curved portion 103 which is a broad aspect of the barrel portion 101, the cross-section of the barrel portion 101 can be easily deformed as compared to the case of a circular shape of the cross-section of the barrel portion.

Further, in the Patent Literature 2, a container of a puncture repair agent is disclosed in which an annular expanded and shrunk portion is formed on the side wall surface, and a flat surface is formed in the region surrounded with the expanded and shrunk portion. Even if the internal pressure increases or decreases with change of the sealant for puncture over time, the container can mitigate the internal pressure change, by allowing to expand outward or to shrink inward the flat surface by the elastic deformation of the expanded and shrunk portion. In addition, in the Patent Literature 2, a technique is described which increases the rigidity of the flat surface by setting the wall thickness of the flat surface to be 120 to 150% of the thickness of the expanded and shrunk portion.

Further, in the Patent Literature 3, a preservation and injection container of a sealant is disclosed in which the container body is provide with a volume reduction portion having a compression deformable bellows structure. In this injection container, the workability of the injection of the sealant is enhanced by the volume reduction portion of the bellows structure, whereby, even in a low temperature environment, lowering of the workability of the injection is suppressed.

Moreover, in the Patent Literature 4, a container for a puncture sealant is disclosed in which the barrel portion of the container body is composed of a three-layer stacked body consisting of at least two thermoplastic resins, and including an inner layer, a middle layer and an outer layer. In this container, the gas barrier property of the container is enhanced by forming the middle layer using a gas barrier resin.

By the way, from the viewpoint of improving the workability of puncture repair, a technique that can inject the puncture repair agent into the tire more easily is required. As a countermeasure, a container which can push out the puncture repair agent more easily is required. In order to increase the pushing out performance of the container furthermore, better handling property, better squeezing property and better restoration property are required.

CITATION LIST

Patent Literature

PTL 1: Japanese Laid-Open Patent Application Publication No. 2006-62715
PTL 2: Japanese Laid-Open Patent Application Publication No. 2009-248982
PTL 3: Japanese Laid-Open Patent Application Publication No. 2005-170486
PTL 4: Japanese Patent No. 3875523

SUMMARY OF INVENTION

Technical Problem

However, the liquid bottle 100 of the above Patent Literature 1 is simply configured to have an elliptical shaped barrel portion 101, and so, in any of the handling property, the squeezing property and the restoration property, there exists a limit to further improve the performance.

Further, in the container disclosed in the above Patent Literature 2, the rigidity of the flat surface is enhanced and the pushing out performance of the container is improved, by setting the wall thickness of the flat surface to be 120 to 150% of the thickness of the expanded and shrunk portion. However, the shape of the barrel portion is complicated, since the expanded and shrunk portion and the flat surface barrel portion are indispensable components. Therefore, there are problems that the mold becomes complicated, and the like. Accordingly, a simple shaped barrel portion is required that does not complicate the mold.

With regard to the preservation and injection container of the sealant disclosed in the above Patent Literature 3, the container is easily squeezed due to the volume reduction of the bellows structure, but because of the bellows structure, the squeezed container is difficult to restore. Therefore, there exists a problem that the restoration property is poor and it takes time to push out the sealant.

Note that the above Patent Literature 4 only describes a technique for enhancing the gas barrier property of the container mainly, and does not describe the technology capable of realizing further improvement in pushing out performance.

Therefore, the present invention has been made in view of such circumstances. It is an object to provide a container of a puncture repair agent that is excellent in the handling property, the squeezing property and the restoration property and further is capable of pushing out the puncture repair agent more easily by taking a simpler shaped barrel portion.

Solution to Problem

The container for puncture repair agent of the present invention is understood by the following configurations.

(1) A container of a puncture repair agent comprises: a bottomed cylindrical container body to store the puncture repair agent; and a mouth portion provided on the container body, from which the puncture repair agent is pushed out by pressing the container body, wherein the container body is hollow molded into a flat shape and comprises a shoulder portion connected to a lower end of the mouth portion, a barrel portion connected to a lower end of the shoulder portion, and a bottom portion closing a lower end of the barrel portion, wherein the barrel portion comprises a pair of narrow portions facing in a major axis direction, and a pair of wide portions facing in a minor axis direction, and wherein each of the pair of wide portions is provided with a pressing recessed portion capable of being recessed in a concave curved surface shape toward inside of the barrel portion.

(2) In the configuration (1) of the container, the wide portion may be set such that a wall thickness at a center portion of the wide portion is larger than a wall thickness at both ends in the major axis direction of the wide portion.

(3) In the configuration (1) of the container, the wide portion may be set such that the wall thickness at the center portion of the wide portion is 1.2 to 1.6 times of the wall thickness at both ends in the major axis direction of the wide portion.

(4) In any one of the configurations (1) to (3) of the container, the wide portion may be set such that the wall thickness at the center portion of the wide portion is larger than the wall thickness at both ends in a height direction of the wide portion.

(5) In the configuration (4) of the container, the wide portion may be set such that the wall thickness at the center portion of the wide portion is 1.2 to 1.6 times of the wall thickness at both ends in the height direction of the wide portion.

(6) In any one of the configurations (1) to (5) of the container, the container body may have a multi-layered structure of at least three layers comprising an inner layer, an intermediate layer and an outer layer, the intermediate layer comprising a gas barrier resin.

(7) In the configuration (6) of the container, the gas barrier resin may be an ethylene-vinyl alcohol resin.

(8) In any one of the configurations (1) to (7) of the container, the container may further comprises: a seal member bonded to a top surface of the mouth portion to seal the mouth portion; and a lead cap fitted to the mouth portion, the lead cap provided with an outlet pipe capable of leading out the puncture repair agent from the container body by breaking the sealing member when the lead cap is fitted to the mouth portion.

(9) In the configuration (1) of the container, the container may further comprises: a seal member bonded to a top surface of the mouth portion to seal the mouth portion; a protective plate detachably superposed to the seal member to protect the seal member; a shrink film formed in a substantially cylindrical shape with a heat-shrinkable synthetic resin film to cover at least the mouth portion and hold the protective plate by heat shrinking; and a lead cap fitted to the mouth portion in a state that the shrink film is peeled off and the protective plate is removed, the lead cap provided with an outlet pipe capable of leading out the puncture repair agent from the container body by breaking the sealing member when the lead cap is fitted to the mouth portion.

(10) In the configuration (9) of the container, the shrink film may be a shrink label covering an outer peripheral surface of the mouth portion and an outer peripheral surface of the container body.

(11) In the configuration (9) or (10) of the container, the shrink film may be colored over a range of at least 80% or more of a back surface thereof, and has an ultraviolet transmittance less than 50%.

Advantageous Effects of Invention

According to the present invention, the user can grasp firmly the container body by pressing the pressing recess portion, and as well can largely elastically deform the container body by pressing the pressing recess portion. Thus, a container of a puncture repair agent that is excellent in the handling property, the squeezing property and the restoration property and further is capable of pushing out the puncture repair agent more easily by taking a simpler shaped barrel portion which is only for forming the pressing recess portion.

BRIEF DESCRIPTION OF DRAWINGS

FIG. 4 is a diagram illustrating the measurement points of the wall thickness of the barrel portion.

FIG. 8 is a diagram for explaining the action of the seal material.

FIG. 9 is a diagram for explaining the action of the container body.

FIG. 11 is a diagram for explaining the action of the liquid bottle of the comparative example.

FIG. 16 is a diagram for explaining the action of the perforations.

FIG. 17 is a diagram for explaining the operation of the sealing film.

FIG. 19 is a diagram for explaining a basic configuration of a conventional liquid bottle.

DESCRIPTION OF EMBODIMENTS

In the followings, referring to the accompanying drawings, embodiments of the present invention (hereinafter, embodiments) shall be described in detail. Note that the same numbers are given to the same elements throughout the description of the embodiments.

Embodiment 1

Figure 1:
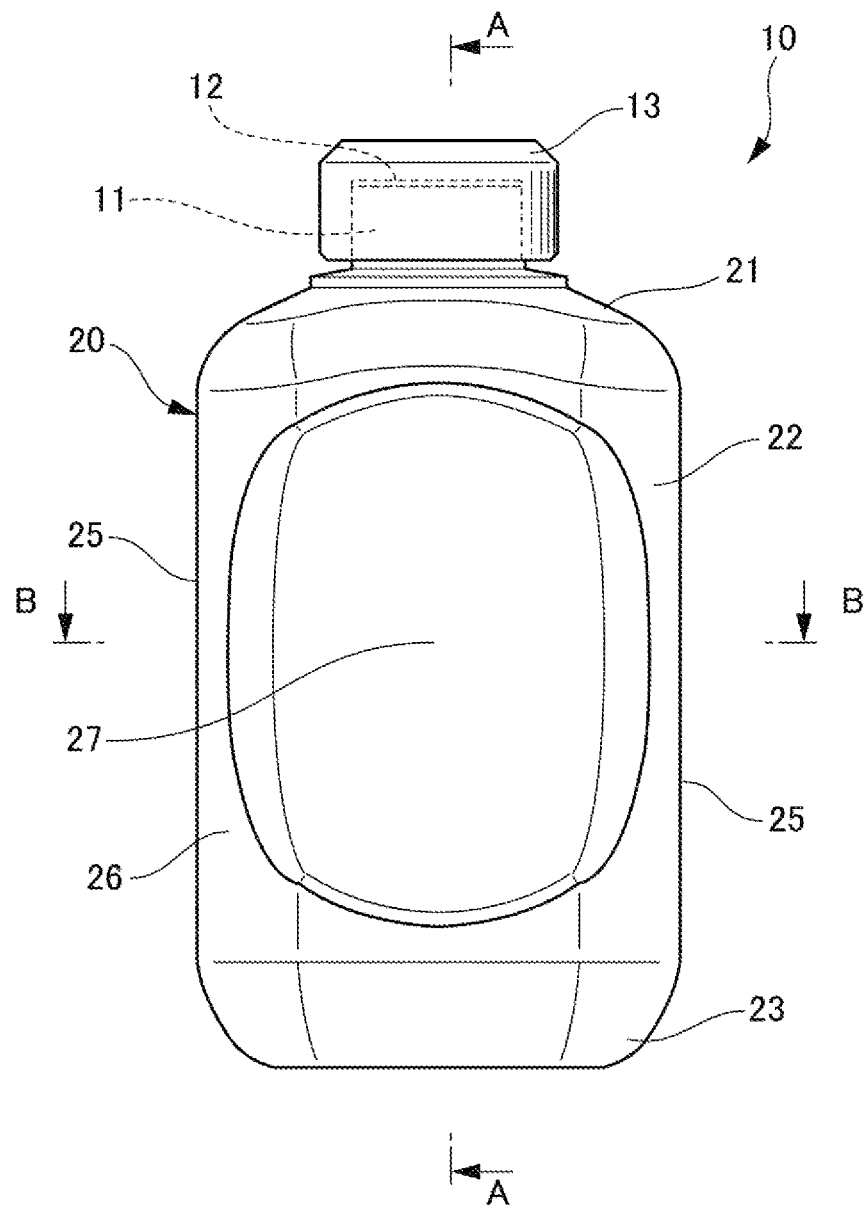
FIG. 1 is a front view of the container of the puncture repair agent according to the embodiment.

As illustrated in FIG. 1, a container 10 of a puncture repair agent (hereinafter referred to as "container 10") according to the embodiment 1 has a self-sustainable bottomed cylindrical container body 20, a mouth portion 11 provided at the upper end of the container body 20, a sealing member (lid member) 12 for sealing the mouth portion 11 and a protective cap 13 which is applied to the mouth portion 11. The container body 20 and the mouth portion 11 are molded integrally using a synthetic resin. For example, they are manufactured by an injection blow molding that inflates an injection molded preform through heating and softening, or by a direct blow molding that inflates a tubular parison in a molten state.

Figure 2:
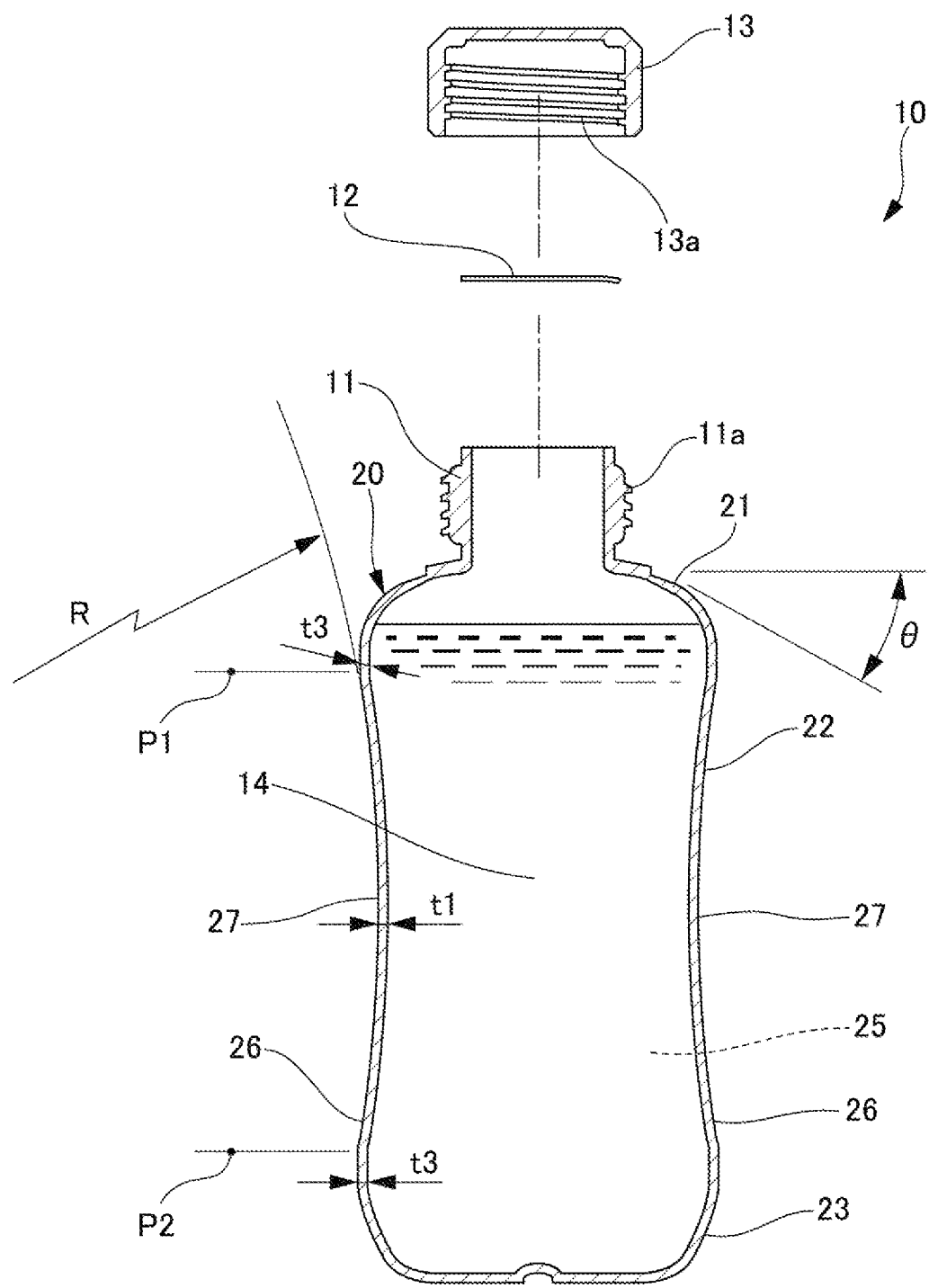
FIG. 2 is a cross-sectional view taken along line A-A in FIG. 1, and is an exploded view of the container.

As illustrated in FIG. 2, the mouth portion 11 is formed substantially in a cylindrical shape, and on the outer peripheral surface of the mouth portion 11, a male screw portion 11a is provided. The sealing member 12 is formed substantially in a circular shape, is made of an aluminum foil or an aluminum vapor deposition film, and has high gas barrier property. The sealing member 12 is welded to the top surface of the mouth portion 11, to seal the mouth portion 11. For welding the sealing member 12, it is desirable to use a high-frequency welding which does not affect the heat to a portion other than the top surface of the mouth portion 11, and moreover makes it possible to weld the sealing member 12 in a short time. When using the high-frequency welding, the sealing member 12 is pushed to the top surface of the mouth portion 11 under pressure, and as well the sealing surface between the mouth portion 11 and the sealing member 12 is internally heated by the high frequency and welded.

The protective cap 13 is molded using a synthetic resin by an injection molding or the like, and has a female screw portion 13a on the inner peripheral surface. The female screw portion 13a is screwed into the male screw portion 11a of the mouth portion 11. When the container 10 is stored in the luggage compartment of the vehicle, the protective cap 13 is mounted to the mouth portion 11 over the sealing member 12, to protect the sealing member 12 and the mouth portion 11. On the other hand, when repairing a punctured tire, the protective cap 13 is removed from the mouth portion 11, and the mouth portion 11, a lead means (described later) for leading a puncture repair agent 14 from the container body 20 is mounted to the mouth portion 11.

In the container body 20, the puncture repair agent 14 is filled and stored in an amount that is determined in accordance with the type of the tire (for example, about 450 cm$^3$). The puncture repair agent 14 can be any sealant, for example, a high viscosity liquid composed mainly of a rubber latex having a viscosity around 40 cps (20° C.).

The container body 20 is composed of a shoulder portion 21, barrel portion 22 and a bottom portion 23. The shoulder portion 21 is connected to the lower end of the mouth portion 11, and is formed so as to radially enlarge downward. The inclination angle θ of the shoulder portion 21 to the direction perpendicular to the axis of the container 10 (the horizontal direction of the container 10 which is upright) is set arbitrarily, taking into consideration the buckling strength required to the container body 20, the moldability of the container body 20 and the like.

Figure 3:
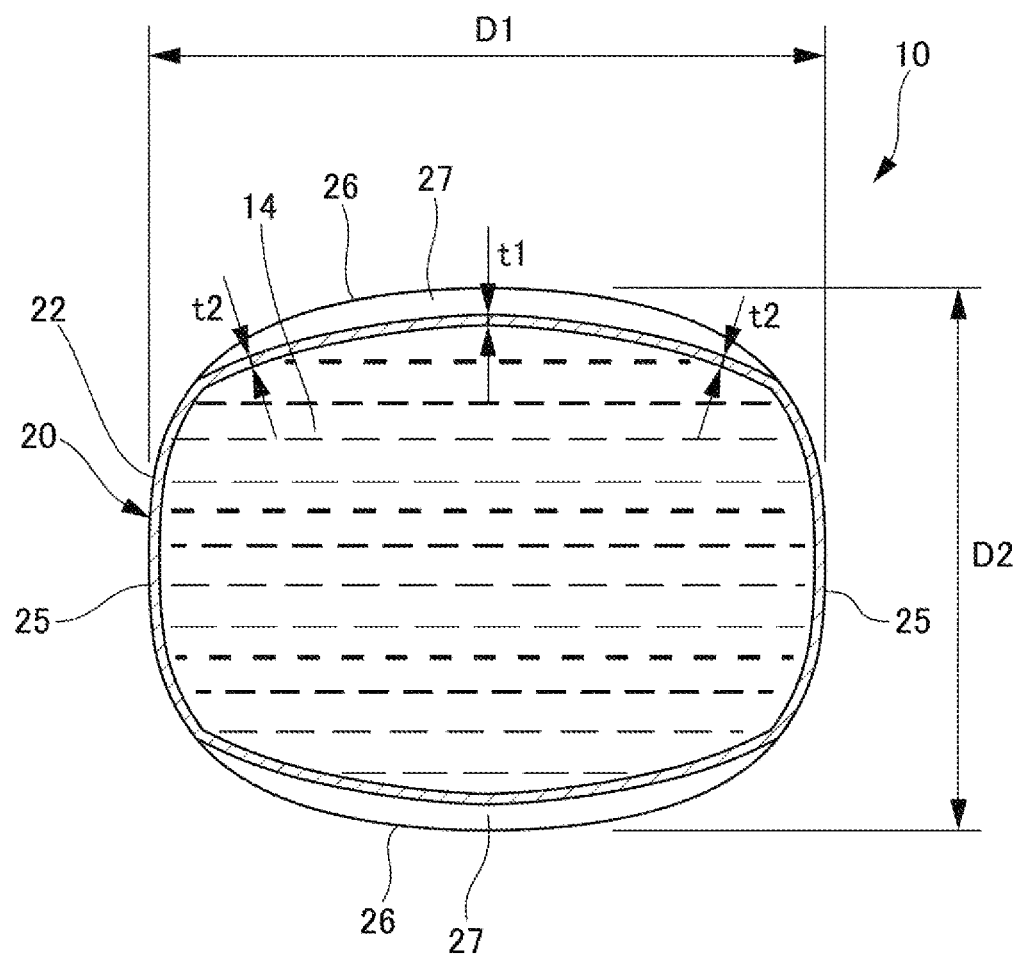
FIG. 3 is a cross-sectional view taken along line B-B in FIG. 1

The barrel portion 22 is connected to the lower end of the shoulder portion 21, and as well, as illustrated in FIG. 3, is formed into a flat shape. Here, the cross-section of the barrel portion 22 along line B-B is formed in a substantially rectangular shape having a rounded four corners. By this, the barrel portion 22 is constituted by a pair of narrow portions 25 facing in the major diameter direction, and a pair of wide portions 26 facing in the minor diameter direction. Specifically, it is constituted by a curve in which the narrow portion 25, the wide portion 26 and the boundary portion have different curvatures, respectively. A dimensional ratio (D2/D1) of the major diameter D1 and minor diameter D2 of the barrel portion 22 is set arbitrarily depending on the gripping property of the barrel portion 22, the stretching ratio of the barrel portion 22 and the like.

Return to FIG. 2. As illustrated in FIG. 2, the longitudinal cross-section of the barrel portion 22 along line A-A is a rectangular shape basically, and each of the pair of wide portions 26 is provided with a pressing recess portion 27. The pressing recess portion 27 is formed in a concave surface shape in the container side view, and is formed to be recessed deepest in the vicinity of the center of the wide portion 26. The upper end position P1 of the pressing recess portion 27 reaches the vicinity of the lower end of the shoulder portion 21, and the lower end position P2 of the pressing recess portion 27 reaches the vicinity of the upper end of the bottom portion 23. Thus, the pressing recess portion 27 is formed widely over almost the entire surface of the wide portion 26. Further, the shoulder portion 21 and the bottom portion 23 have a chamfered curved surface shape in the vicinity of the pressing recess portion 27. When the pressing recess portion 27 is pressed by a user, while operation of bending inward the entire wide portion 26 greatly is performed, operation of deforming compressively the barrel portion 22 greatly is performed.

Furthermore, the curvature radius R of the pressing recess portion 27 is set to an arbitrary magnitude depending on the pushing out performance required to the container body 20, the moldability of the container body 20 and the like. In addition, the pressing recess portion 27 may be configured by a curved surface that combines multiple radii of curvature, besides by a curved surface of one radius of curvature R. Further, in this example, the cross-section of the barrel portion 22 is taken as an almost rectangular shape, but the pressing recess portion according to the present invention, for example, by forming the barrel portion into a flat shape by taking the cross-section of the barrel portion as a substantially elliptical shape, may be provided in the curved portion of the facing large diameter side.

Here, the thickness distribution in the container body 20 is described. In order to enhance the squeezing property and the restoration property of the barrel portion 22, it is desirable that the wall thickness at the center portion t1 (refer to FIG. 3) of the wide portion 26 is set larger than the thickness of the both end portions in the major diameter direction t2 of the wide portion 26 (refer to FIG. 3), and, the wall thickness at the center portion t1 (refer to FIG. 2) is set larger than the wall thickness at both ends in height direction t3 (refer to FIG. 2) of the wide portion 26

The present inventors have advanced various research and development, for obtaining a more preferable thickness distribution. As a result, through the overall judging including the moldability and the quality of the container body 20, in order to obtain the high squeezing property and the high restoration property, it has been found to be preferable that the wall thickness at the center portion t1 is set to 1.2 to 1.6 times the wall thickness at both ends in the major diameter direction t2, and the wall thickness at the center portion t1 is set to 1.2 to 1.6 times the wall thickness at both ends in the height direction t3. Meanwhile, the effects by setting the thickness distribution shall be described later.

In the followings, an example of a suitable thickness distribution shall be described in detail on the basis of the measured results of the container body 20 (a blow-molded product). To exemplify the specification of the blow-molded product, the mass is 31.87 g, and the filling capacity is about 483.6 cm$^3$.

Figure 4A:
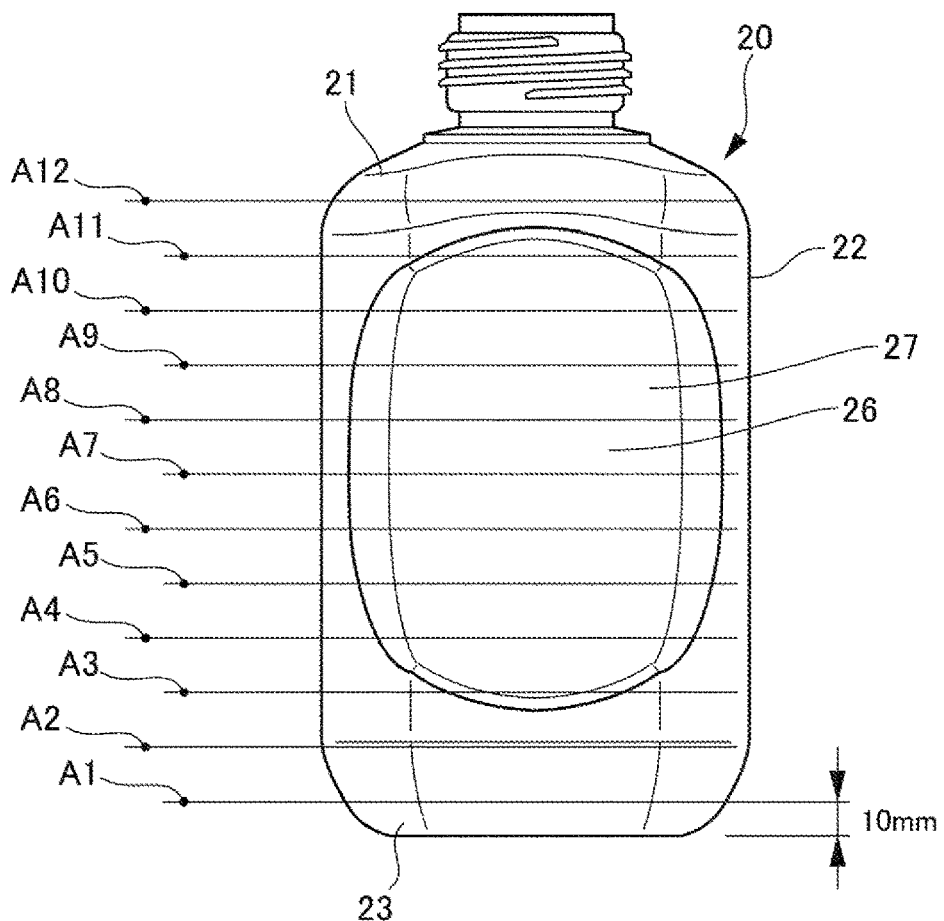
FIG. 4A is a diagram illustrating the measurement position in the height direction.
Figure 4B:
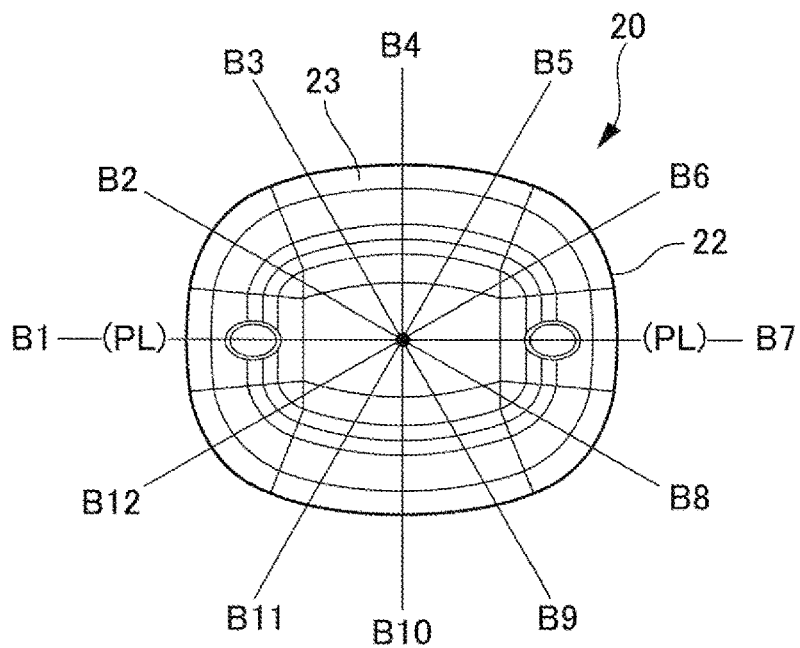
FIG. 4B is a bottom view of FIG. 4A and is a diagram illustrating the measurement direction in the circumferential direction.

The measurement points of the wall thickness in the container body 20 shall be described with reference to FIG. 4. As illustrated in FIG. 4A, the positions for measuring the thickness distribution in the height direction were in a range from 10 mm in height from the bottom surface of the bottom portion 23 to the shoulder portion 21, and a total of 12 points at 10 mm intervals (measurement positions A1 to A12) were set. Further, as illustrated in FIG. 4B, with regard to the directions of measuring the thickness in the circumferential direction, in the range from minus side (direction B1) of the parting line PL which is the dividing position of the mold to 360° in clockwise, a total of 12 directions at an angular pitch of 30° (measurement directions B1 to B12) were set. In addition, in the measurement of the wall thickness, a digital micro meter was used. Further, the thickness distribution in the circumferential direction was measured at a height of 60 mm from the bottom surface (measurement position A6).

Figure 5:
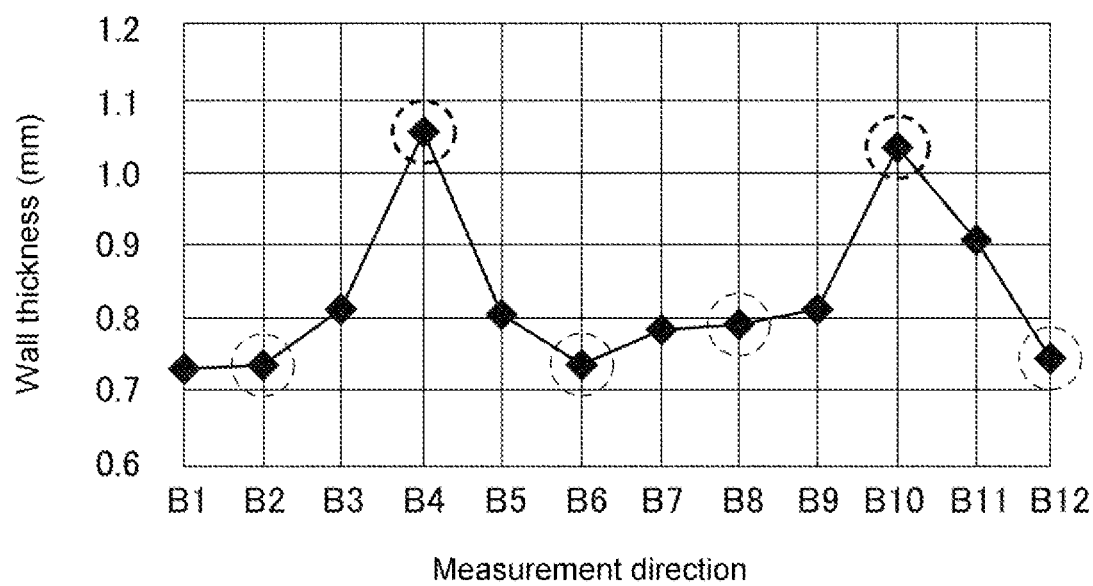
FIG. 5 is a graph illustrating an example of thickness distribution in the circumferential direction of the barrel.

The measurement results of the thickness distribution in the circumferential direction are illustrated in TAB. 1. A graph of the measurement results in TAB. 1 is illustrated in FIG. 5. In FIG. 5, the horizontal axis is the measurement direction (B1 to B12), the vertical axis represents the wall thickness (mm).

As illustrated in TAB. 1 and FIG. 5, the wall thickness in the vicinity of the center of the wide portion 26 (measurement direction B4, B10) is about 1.0 to 1.1 mm, and the wall thickness at both ends in the major diameter direction (measurement direction B2, B6, B8, B12) is about 0.7 to 0.8 mm. Thus, it is understood that in the thickness distribution in the circumferential direction, the wall thickness at the center portion t1 (refer to FIG. 3) is greater than the thickness at both ends in the major diameter direction t2 (refer to FIG. 3), and is a suitable magnitude (in the range of 1.2 to 1.6 times the wall thickness at both ends in the major diameter direction t2).

Figure 6:
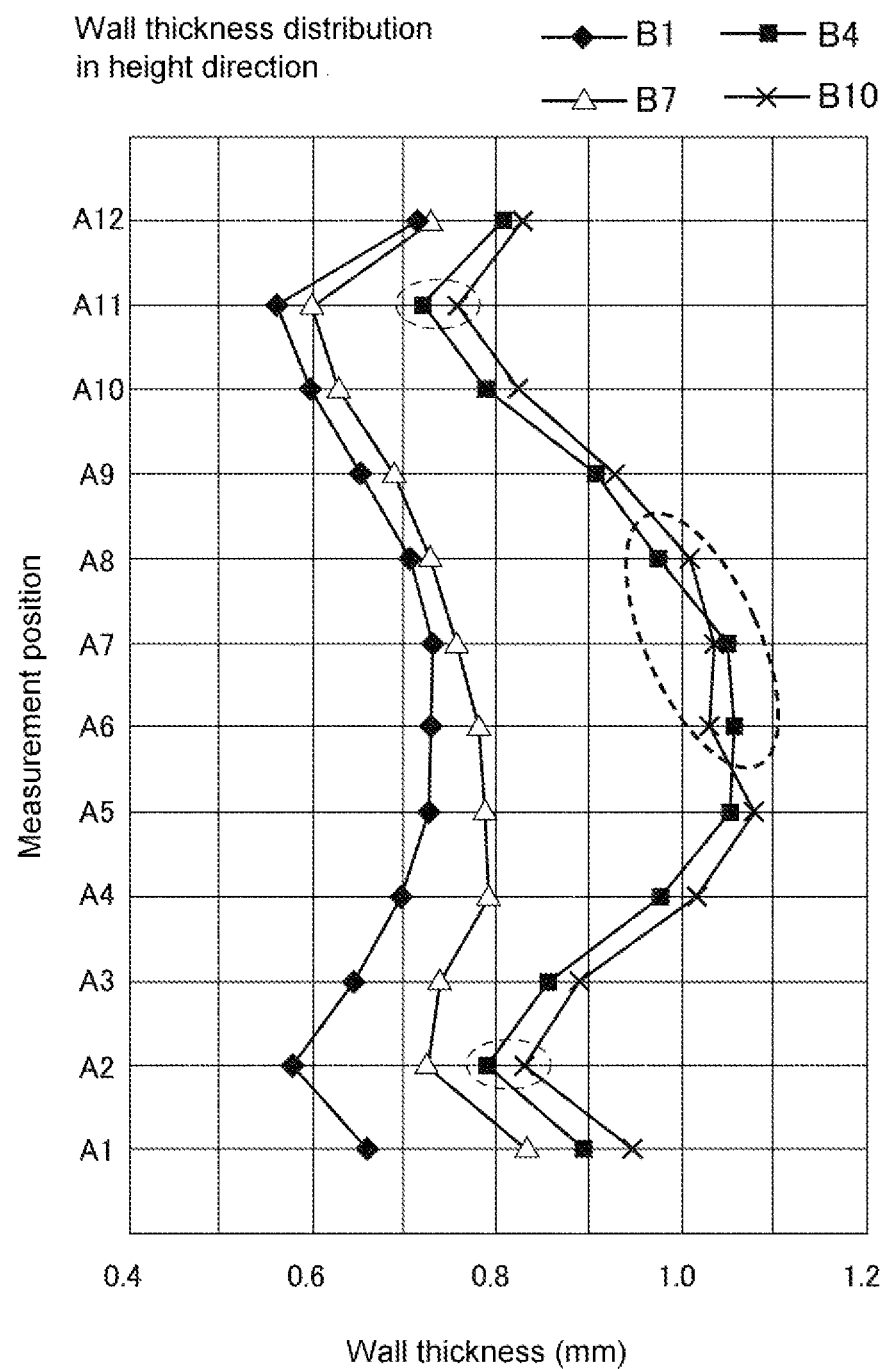
FIG. 6 is a graph illustrating an example of thickness distribution in the height direction of the barrel.

Next, the measurement results of the thickness distribution in the height direction are illustrated in TAB. 2, and a graph of the measurement results in TAB. 2 is illustrated in FIG. 6. In FIG. 6, the horizontal axis is the wall thickness (mm), the vertical axis represents the measurement position (A1 to A12).

TABLE 2

Height direction wall thickness distribution (mm)

| | | Measurement direction | | | | Average value |
|---|---|---|---|---|---|---|
| | | B1 | B4 | B7 | B10 | |
| Measurement position | A12 | 0.713 | 0.807 | 0.727 | 0.823 | 0.768 |
| | A11 | 0.562 | 0.720 | 0.597 | 0.757 | 0.659 |
| | A10 | 0.598 | 0.789 | 0.628 | 0.821 | 0.709 |
| | A9 | 0.652 | 0.908 | 0.689 | 0.923 | 0.793 |
| | A8 | 0.706 | 0.973 | 0.725 | 1.008 | 0.853 |
| | A7 | 0.730 | 1.048 | 0.756 | 1.036 | 0.893 |
| | A6 | 0.729 | 1.057 | 0.779 | 1.030 | 0.899 |
| | A5 | 0.727 | 1.051 | 0.787 | 1.077 | 0.911 |
| | A4 | 0.698 | 0.977 | 0.792 | 1.016 | 0.871 |
| | A3 | 0.646 | 0.856 | 0.738 | 0.890 | 0.783 |
| | A2 | 0.579 | 0.788 | 0.723 | 0.830 | 0.730 |
| | A1 | 0.661 | 0.897 | 0.828 | 0.944 | 0.833 |
| Average value | | 0.667 | 0.906 | 0.731 | 0.930 | 0.808 |

As illustrated in TAB. 2 and FIG. 6, the wall thickness in the vicinity of the center of the wide portion 26 (measurement position A6 to A8 in the measurement direction B4, B10) is about 0.8 mm. Thus, it is understood that in the thickness distribution in the height direction, the wall thickness at the center portion t1 (refer to FIG. 3) is greater than the thickness at both ends in the height direction t3 (refer to FIG. 2), and is a suitable magnitude (in the range of 1.2 to 1.6 times the wall thickness at both ends in the height direction t3).

Then, the material and the layer structure of the container body 20 are described. The container body 20 is composed of any of the synthetic resin materials. However, in storing the puncture repair agent 14 for a long-period (for example, five years), for preventing degradation, alteration or corrosion of the puncture repair agent 14 by oxygen, or for suppressing decrease of water vapor, ammonia and the like,

TABLE 1

Circumferential wall thickness distribution (mm)
Height 60 mm (measurement position A6)
Measurement direction

| B1 | B2 | B3 | B4 | B5 | B6 | B7 | B8 | B9 | B10 | B11 | B12 | Average value |
|---|---|---|---|---|---|---|---|---|---|---|---|---|
| 0.729 | 0.733 | 0.814 | 1.057 | 0.804 | 0.734 | 0.779 | 0.789 | 0.811 | 1.030 | 0.903 | 0.740 | 0.827 | in the puncture repair agent 14, it is necessary to provide a high storage performance to the container body 20. In order to provide the high storage performance to the container body 20, it is effective to suppress the gas permeability of the container body 20 to a low level, by constituting the container body 20 with a multilayer structure including a high gas barrier material.

For example, the container body 20 is configured in a multilayer structure of at least three layers including an inner layer, an intermediate layer and an outer layer, and the intermediate layer is configured with a gas barrier resin. For the gas barrier resin, an Ethylene-Vinyl Alcohol resin (EVOH) is preferred with which high gas barrier property can be obtained a thin even at a thin thickness. Further, the material of the inner layer and the outer layer sandwiching the intermediate layer can be selected from any of the synthetic resins such as polyethylene, polypropylene, polyester and the like. The container body 20 of such a multilayer structure can be obtained by blow molding using a multi-layer parison, for example.

Figure 7:
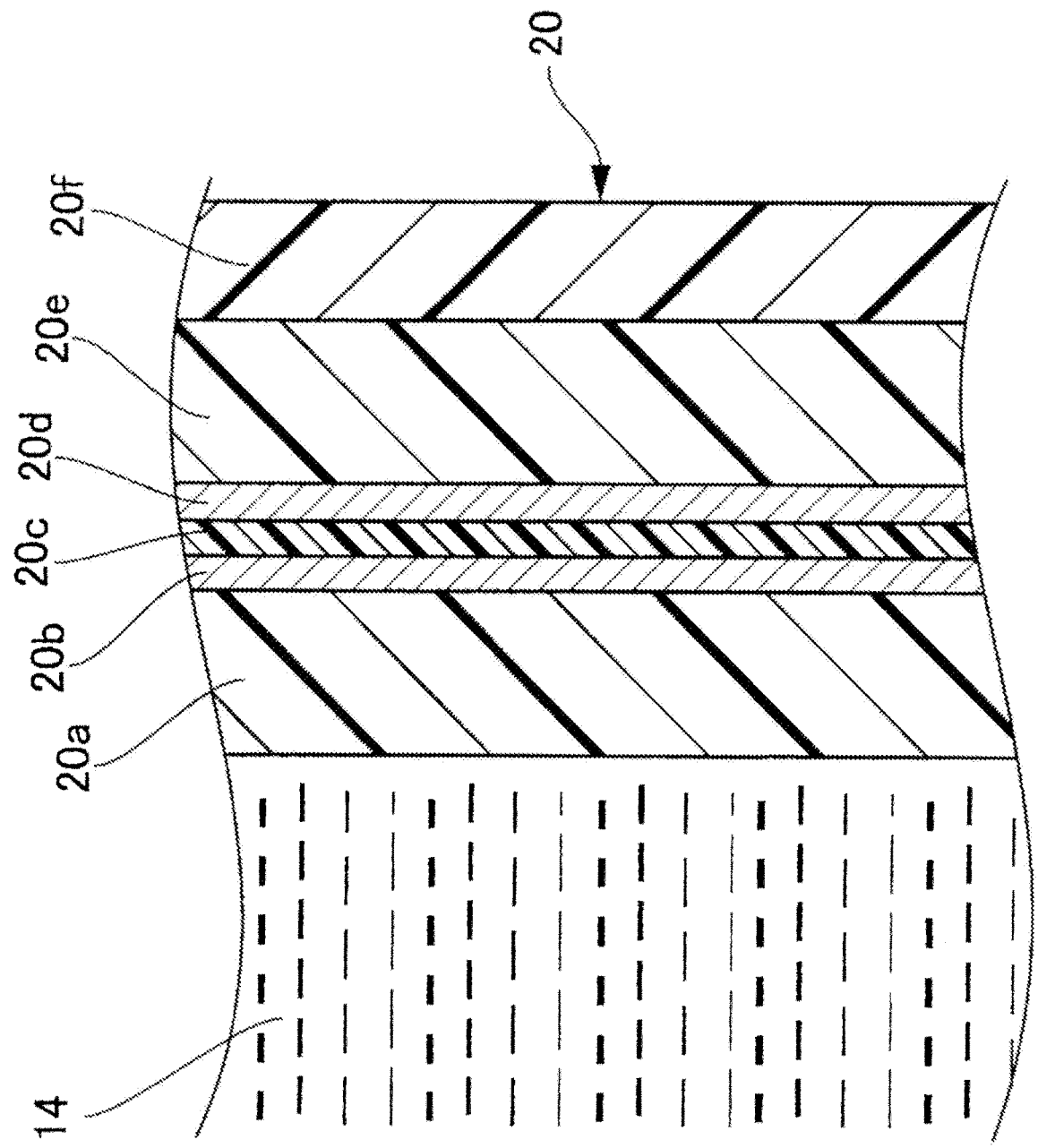
FIG. 7 is a cross-sectional view illustrating an enlarged wall of the container body of the multi-layer structure.

An example of a multi-layer structure of the container body 20 shall be described with reference to FIG. 7. As illustrated in FIG. 7, the multilayer structure is configured with six layers, and is a stack of four six layers of four kinds of materials. Here, from the inside (the puncture repair agent 14 side), a first layer 20a made of a low density polyethylene, a second layer 20b of an adhesive layer, a third layer 20c made of an EVOH, a fourth layer 20d of an adhesive layer, a fifth layer 20e made of a recycled material, and, a sixth layer 20f made of a low density polyethylene are sequentially stacked. In addition, for the recycled material of the fifth layer 20e, it is possible to use the removed unnecessary portions from the molded products (so-called burr).

An example of the thickness of each layer of such multilayer structure and the component ratio are illustrated in TAB. 3. In the table, in the parentheses, the component ratio of each layer is given.

layer, it is possible to reduce the environmental load and as well to achieve further cost reduction.

Note that in the embodiment, the gas permeability of the container body 20 was kept low by the multilayer structure including the gas barrier resin, but in addition to this, it is effective to improve the gas barrier property of the container body 20 by a deposited thin film layer of aluminum or aluminum alloy, alumina, silica or the like that is deposited to the surface of the container body 20 (for example, inner surface).

Figure 8A:
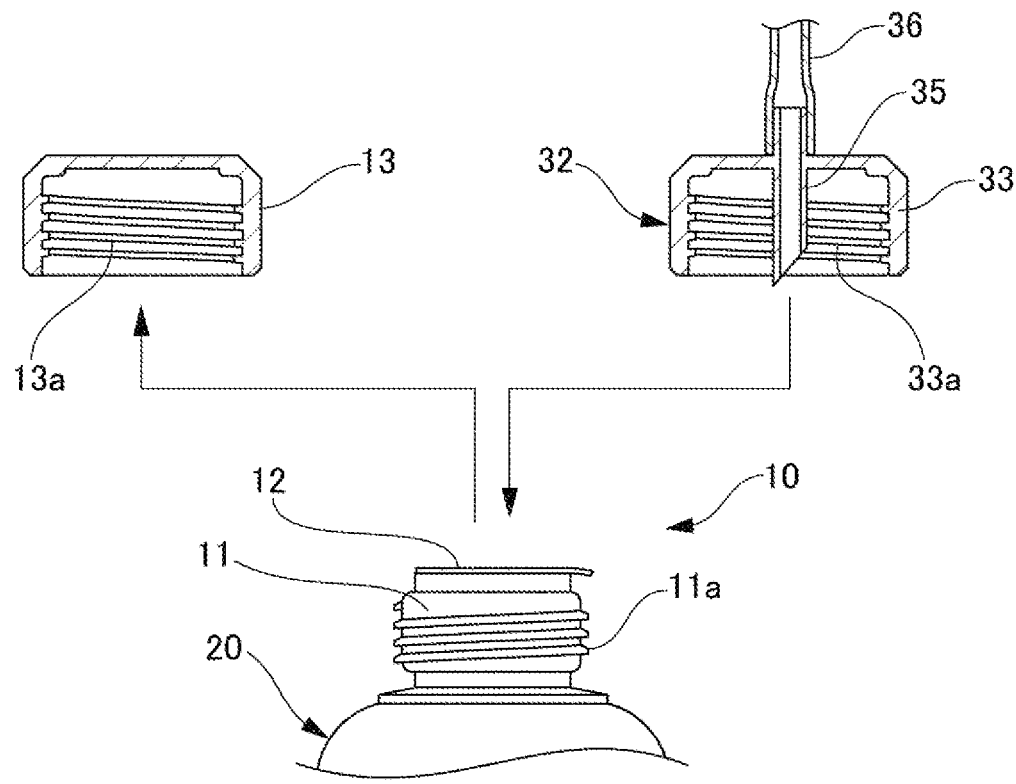
FIG. 8A is a side view of the mouth portion before mounting the leading out means.

Using the container 10 as described above, a method for repairing a punctured tire shall be described with reference to FIG. 8 and FIG. 10. As illustrated in FIG. 8A, in repairing puncture, a lead means (in this specification, sometimes referred to as lead cap) 32 is used. The lead means 32 has a fitting portion 33 which can be fitted into the mouth portion 11, and a lead pipe 35 which penetrates the center of the fitting portion 33. The fitting portion 33 has a female screw portion 33a to be screwed into the male screw portion 11a of the mouth portion 11. To the downstream end of the lead pipe 35, an injection hose 36 is connected.

Figure 8B:
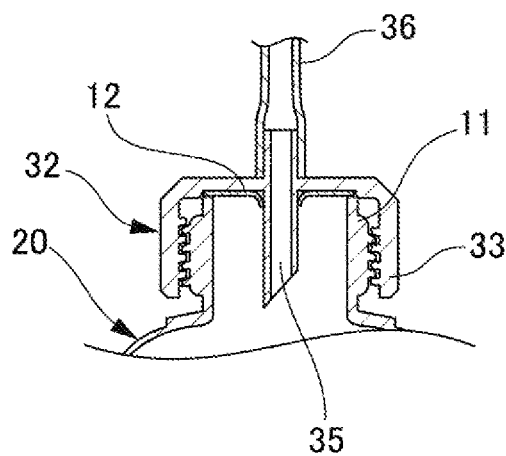
FIG. 8B is a cross-sectional view of the mouth of after mounting the leading out means.

At first, the user removes the protective cap 13 from the mouth portion 11, and instead screws the fitting portion 33 to the mouth portion 11 to mount the lead means 32 to container body 20. At this time, the sealing member 12, as illustrated in FIG. 8B, is broken by the tip of the lead pipe 35 to be inserted into the mouth portion 11. By this, the inside and the outside of the container body 20 are communicated by the lead pipe 35. In addition, the top surface of the mouth portion 11 is sealed by the fitting portion 33, and so no fear of leaking of the puncture repair agent appears in the vicinity of the mouth portion 11.

Figure 9A:
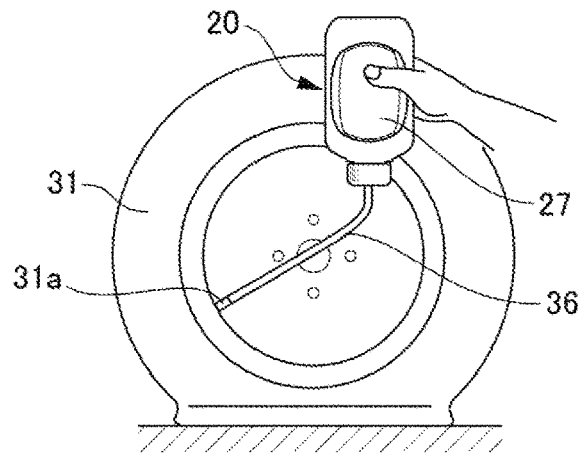
FIG. 9A is a diagram explaining the handling property of the container body.
Figure 9B:
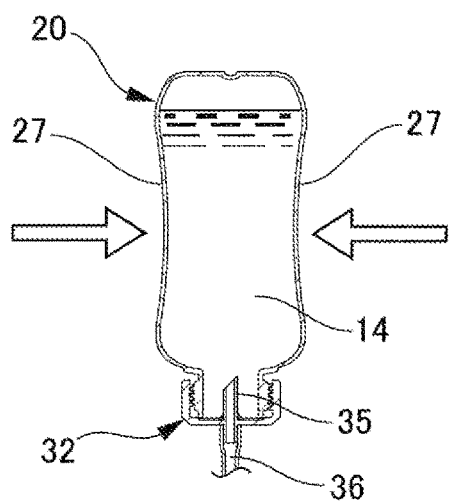
FIG. 9B is a diagram explaining the squeezing property of the container main body.

Next, as illustrated in FIG. 9A, after connecting the downstream end of the injection hose 36 to the valve 31a of the punctured tire 31, the container body 20 is inverted, and a pair of pressing recess portions 27 are grasped. Then, as illustrated in FIG. 9B, the pair of pressing recess portions 27

TABLE 3

| | Thickness of each layer (mm) Component ratio in parentheses | | | | | | |
|---|---|---|---|---|---|---|---|
| Measurement direction | 1st layer (outermost layer) | 2nd layer | 3rd layer | 4th layer | 5th layer | 6th layer (innermost layer) | Total thickness |
| B1 | 264 (33.0%) | 12 (1.5%) | 16 (2.0%) | 23 (2.9%) | 285 (35.6%) | 200 (25.0%) | 801 (100%) |
| B10 | 340 (29.3%) | 12 (1.1%) | 32 (2.8%) | 30 (2.5%) | 416 (35.8%) | 330 (28.4%) | 1160 (100%) |
| B7 | 273 (32.9%) | 15 (1.8%) | 23 (2.8%) | 16 (2.0%) | 277 (33.5%) | 224 (27.0%) | 828 (100%) |
| B4 | 356 (31.9%) | 24 (2.1%) | 25 (2.2%) | 19 (1.7%) | 359 (32.2%) | 334 (29.9%) | 1116 (100%) |
| Average value | 308 (31.8%) | 16 (1.6%) | 24 (2.4%) | 22 (2.3%) | 334 (34.3%) | 272 (27.6%) | 976 (100%) |

Figure 9C:
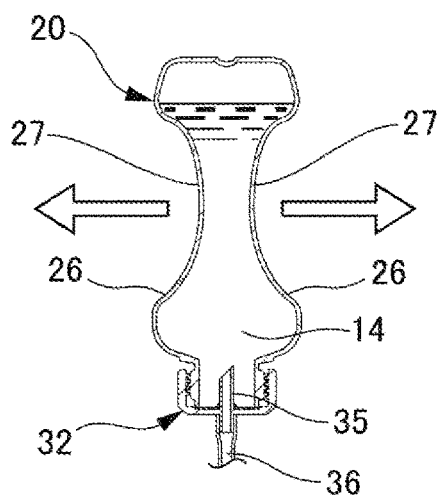
FIG. 9C is a diagram explaining the restoration property of the container body.

As illustrated in TAB. 3, by forming thick the first and the sixth layers consisting of a low density polyethylene and the fifth layer consisting of a recycled material, the moldability and the stiffness of the container body 20 (refer to FIG. 2) are ensured. On the other hand, the third layer is formed thin, by using an EVOH having excellent gas barrier property even at thin thickness. By this, high gas barrier property are provided to the container body 20, and degradation, alteration or corrosion of the puncture repair agent 14 is prevented, and as well, decrease of water vapor, ammonia and the like, in the puncture repair agent 14 is suppressed. Moreover, the mass and the cost of the container body 20 can be suppressed at a low level, by forming thin the third layer. In addition, by using the recycled materials in the fifth are pressed so as to compress the container body 20. Then, as illustrated in FIG. 9C, the pair of wide portions 26 are elastically deformed greatly so as to approach each other, and the container body 20 is compressed. Thus, the puncture repair agent 14 in an amount corresponding to the volume change of the container body 20 to be compressed is pushed out from the lead pipe 35. The pushed out puncture repair agent 14 is injected into the tire 31 through the injection hose 36.

When the user loosens the hand, the pair of wide portions 26 having been deformed elastically greatly, is released from the pressing force rapidly and the original form is restore. Thus, by performing several times the pumping operation of the container body 20 which brings large decrease of the internal volume and restores quickly, almost all of the puncture repair agent 14 can be injected into the tire 31 in a short time.

Figure 10:
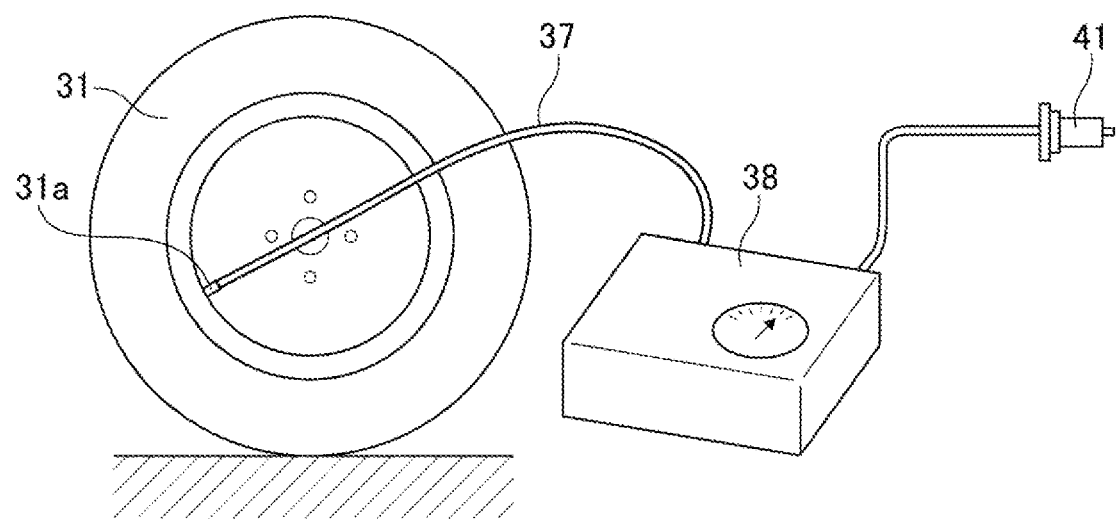
FIG. 10 is a diagram for explaining the work for boosting the tire by the compressor.

Next, as illustrated in FIG. 10, through a pressure hose 37, a compressor 38 is connected to a valve 31a of the tire 31, and the power plug 41 of the compressor 38 is plugged into a power socket of the vehicle. Then, the compressor 38 is actuated to boost the tire 31. After boosting the tire 31 to a specified air pressure, removing the pressure hose 37 and the compressor 38 are removed from the tire and preliminary run of the vehicle is carried out. After finishing the preliminary run, the air pressure of the tire 31 is measured and the air pressure of the tire 31 is boosted by the compressor 38 again if necessary. By this, the puncture repair of tire 31 is completed.

The effect of the container 10 of the embodiment 1 described above is described. In the embodiment 1, the barrel portion 22 of the container body 20 the was formed into a flat shape, the pair of pressing recess portions 27 was provided to the pair of wide portions 26, so that a user can grasp and press the pressing recess portion 27.

Figure 11A:
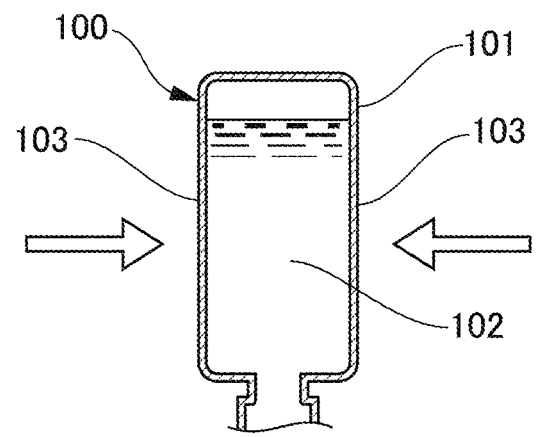
FIG. 11A is a diagram explaining the squeezing property of the liquid bottle.
Figure 11B:
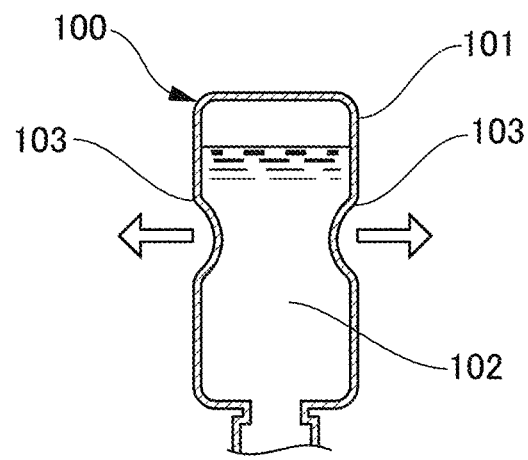
FIG. 11B is a diagram explaining the restoration property of the liquid bottle.

In contrast, as illustrated in FIG. 11A, in a conventional liquid bottle 100, a barrel portion 101 is formed in an elliptical shape, and a user pushes the large diameter curved portion 103. In this case, since the large diameter curved portion 103 is a simple convex curved surface, the handling property is poor. Further, since the large diameter curved portion 103 is curved in a convex shape, as illustrated in FIG. 11B, the pressing force of the user will act on the large diameter curved portion 103 locally, and the reduction amount of the internal volume of the liquid bottle 100 is small. In other words, the squeezing property is poor, and in order to push out all of the sealing agent 102, it is necessary to carry out pumping of the liquid bottle 100 many times. In addition, since the pressing force of the user acts locally, the large diameter curved portion 103 deforms in a depressed condition, and the restoration is also poor.

In this point, in the present embodiment, as illustrated in FIGS. 9A and 9B, since the pressing recess portion 27 having the concave curved surface shape can be gripped and pressed, the hand of the user fits in the pressing recess portion 27 well, and the handling property is much improved. Further, since the pressing recess portion 27 is formed in the concave curved surface shape and is formed wide over almost all the surface of the wide portion 26, the pressing force acts on the whole of the wide portion 26. Thus, as illustrated in FIG. 9C, the entire of the wide portion 26 is elastically deformed greatly, and the reduction amount of the internal volume of the container body 20 is large. As a result, the excellent squeezing property can be obtained. Further, since the entire wide portion 26 is elastically deformed greatly, the wide portion 26 easily returns to the original form, and the restoration is also excellent.

In addition, in the wide portion 26, the wall thickness at the center portion t1 (refer to FIG. 3) was set larger than the wall thickness at both ends in the major diameter direction t2 (refer to FIG. 3), and, the wall thickness at the center portion t1 (refer to FIG. 3) was set larger than the wall thickness at both ends in the height direction t2 (refer to FIG. 2). As a result, the central portion of the pressing recess portion 27 grows thicker, and the corner portions of the periphery of the pressing recess portion 27 grow thinner. Since the rigidity of the central portion of the pressing recess portion 27 increases due to the thickened central portion of the pressing recess portion 27, it becomes easier for a user to press the pressing recess portion 27. On the other hand, in the corner portions of the periphery of the pressing recess portion 27, the rigidity is lowered, and so it becomes easier to deform and to restore. As a result, it is possible to increase considerably the squeezing property and the restoration property of the barrel portion 22.

Thus, according to the present embodiment 1, the container 10 is provided which is excellent in the handling property, the squeezing property and the restoration property, and moreover which can push out the puncture repair agent 14 more easily in just a simple barrel portion shape to form the pressing recess 24.

Further, in the present embodiment, the sealing member 12 made of an aluminum foil or an aluminum vapor deposition film is welded on the top surface of the mouth portion 11, and the sealing member 12 is to be broken by the lead pipe 35.

In contrast, conventionally, a lid structure is known in which an inner plug of a synthetic resin is fitted into the mouth portion, and when repairing the puncture, it is arranged that the bottom portion of the inner plug is broken by a lead pipe. In such a lid structure, in addition to the high component cost of the lid member (inner plug), it is necessary to break the stiff bottom portion of the inner plug, and so the workability is poor.

In this point, in the present embodiment, the mouth portion 11 is closed with the sealing member 12, and so the component cost of the lid member grows cheaper. In addition, since the thin sealing member 12 can be broken by the lead pipe 35, the workability is also good.

Embodiment 2

Figure 12:
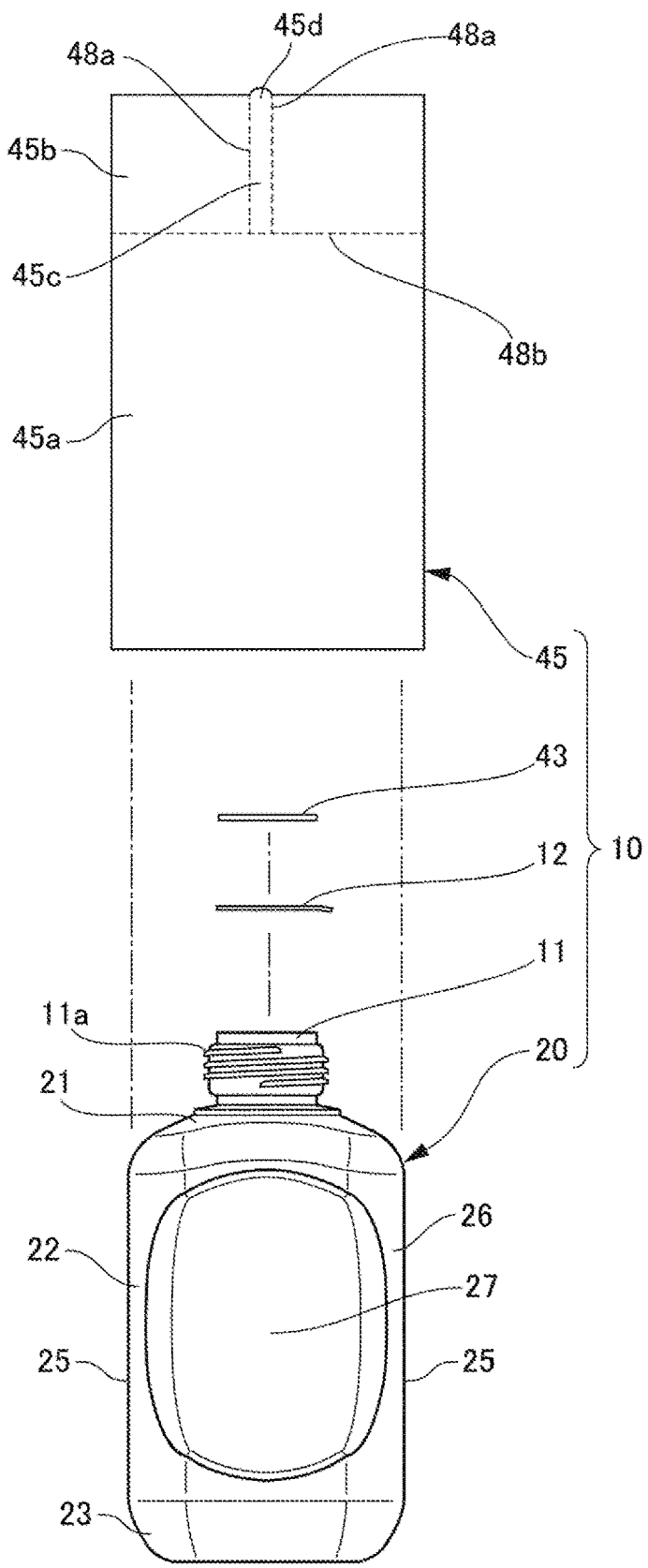
FIG. 12 is an exploded view of the container of the puncture repair agent according to the second embodiment.

FIG. 12 is an exploded view of a container of a puncture repair agent according to an embodiment 2. As illustrated in FIG. 12, a container 10 of a puncture repair agent (hereinafter referred to as "container 10") according to the embodiment 2 has a container body 20 which can store the puncture repair agent to be injected into a punctured tire and is self-sustainable bottomed cylindrical shaped, a mouth portion 11 provided at the upper end of the container body 20, a sealing member 12 for sealing the mouth portion 11, a protective plate 43 which is removably stacked to the sealing member 12 and protects the sealing member 12, and a shrink label 45 which covers the outer peripheral surface of the mouth portion 11 and substantially the entire of the outer peripheral surface of the container body 20. Here, the container body 20 has the same configuration as the container body 20 illustrated in the embodiment 1. For this reason, detailed description of the container body 20 shall be omitted.

The protective plate 43 is formed in a substantially circular shape, and is attached so as to cover substantially the entire sealing member 12 on the sealing member 12. By this, when the container 10 is stored in a storage space of a vehicle, a portion of the sealing member 12 which is easy to break, that is, a non-adhesive portion that is not welded to the top surface of the mouth portion 11 is protected by the protective plate 43. The protective plate 43 can be selected from various sheets of a synthetic resin or a paper, but in view of the weight reduction and the cost, a cardboard sheet or a poster paper which is light and inexpensive is preferable.

Note that the shape of the protective plate 43 is, in this example, a substantially circular shape, but besides this, the other may be a non-circular shape such as a polygonal and the like is possible. As far as the shape can protect the sealing member 12, it is arbitrary. Further, in order to easily attach the protective plate 43, a fitting portion which can be fitted to the mouth portion 11 can be provided on the outer periphery of the protective plate 43.

The shrink label 45 is a shrink film made of a synthetic resin having a heat-shrinkable property, and is formed in a substantially cylindrical shape. The shrink label 45 can be provided with any display by printing or the like. Further, the shrink label 45, after having been put on the container body 20, shrinks by heat along the respective outer peripheral surface of the male screw portion 11a, the shoulder portion 21, the barrel portion 22 and the bottom portion 23, and thereby the outer peripheral surface of the mouth portion 11 and the outer peripheral surface of the container body 20 are covered substantially entirely.

As a material for the shrink label 45, a stretched film which is not heat fixed is preferred, but any type of materials is possible as long as it is heat shrinkable. In addition, the material of the shrink label 45 can be selected from any synthetic resin material such as the polyolefin resin such as a polyethylene, a polypropylene and the like, or the polyester resin such as a polyethylene terephthalate and the like, and either a single-layer film or a stacked film is possible. Further, degradation or alteration of the puncture repair agent by sunlight or fluorescent light may be prevented, by constituting the shrink label 45 using a film having light-shielding property (for example, a film to which a print by a whitish ink is applied widely). In particular, with regard to the ultraviolet light transmittance, less than 50% UV is preferable, less than 10% is more preferable and less than 3% is more preferable, by coloring at least 80% in the range (area), preferably over the entire surface of the transparent shrink label 45, for blocking the ultraviolet light or the visible light. The coloring of the shrink label 45 can be made on the back surface, by coating, vapor deposition, lamination or the like.

As a method for mounting the shrink label 45, a method to heat and heat shrink the shrink label 45 is given that is performed by passing through the well-known steam jet shrink tunnel, after covering a predetermined height position to the container body 20 with the cylindrical shrink label 45, using a well-known labeler. However, the method of mounting the shrink label 45 is not particularly limited, any method for mounting the shrink label 45 by heat shrink is possible, with regard to the container body 20, the mouth portion 11 and the protective plate 43.

Figure 13:
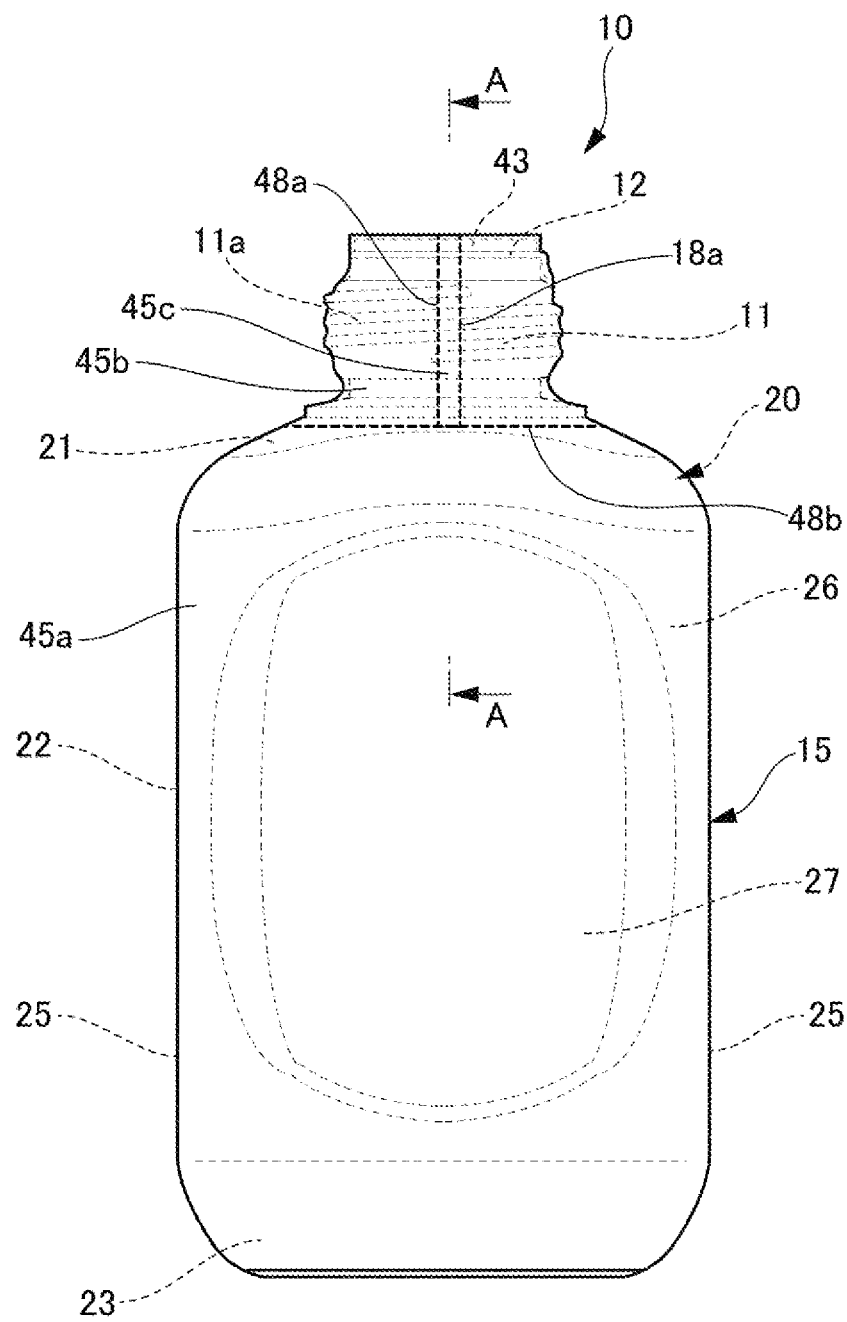
FIG. 13 is a diagram of assembling the container of FIG. 12, and is a front view of the container.
Figure 14:
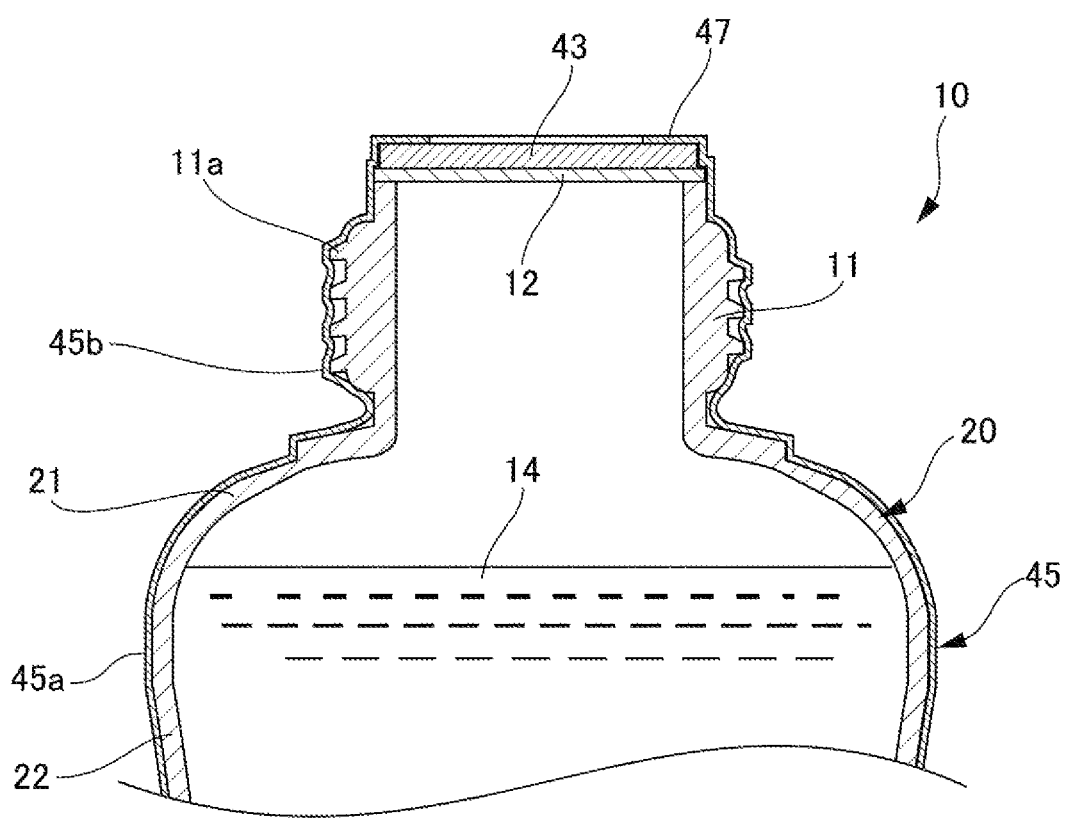
FIG. 14 is a cross-sectional view along line A-A of FIG. 13.
Figure 15:
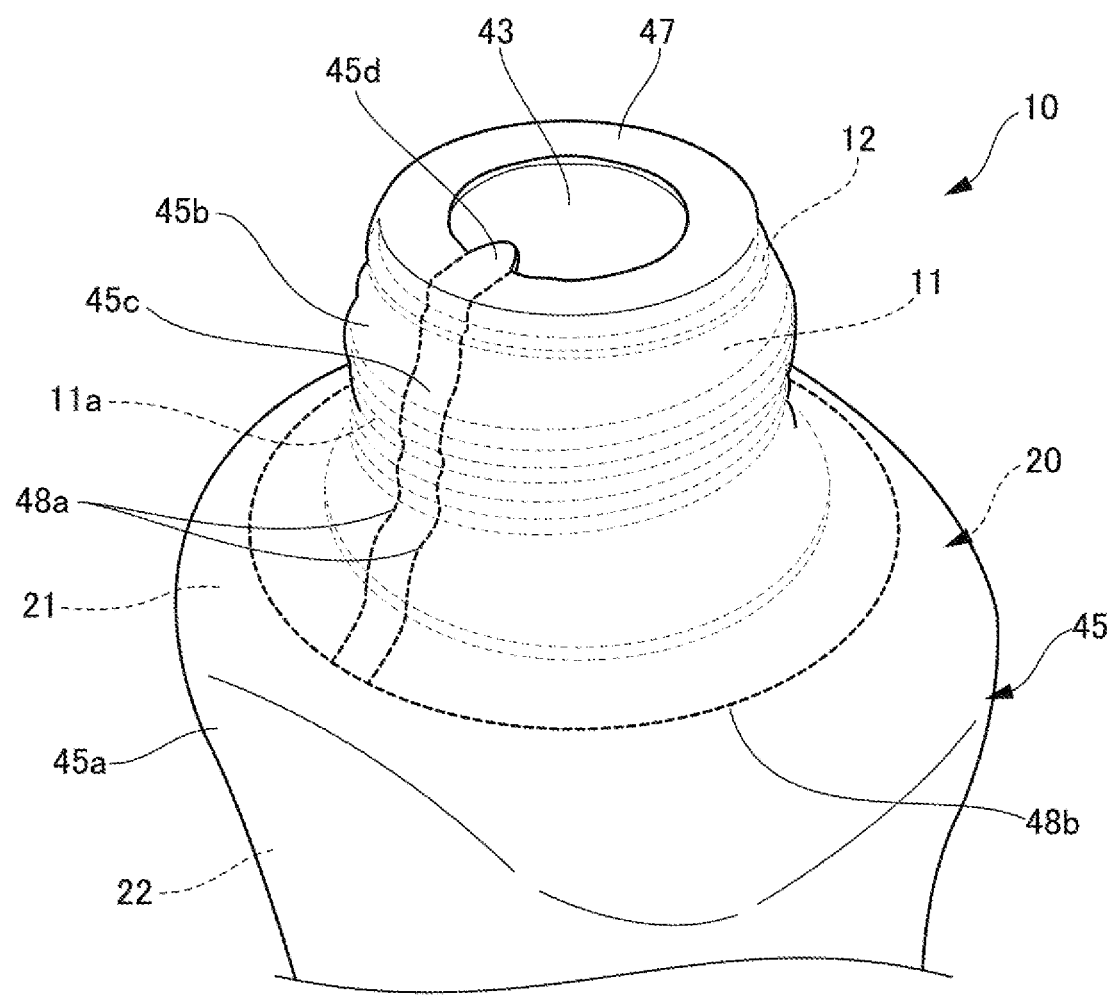
FIG. 15 is a perspective view of the periphery of the mouth portion of the container.

The structure of the shrink label 45 shall be described in more detail on the basis of FIG. 13 to FIG. 15. FIG. 13 is a diagram of the assembled container shown of FIG. 12, and is a front view of the container to which the shrink label is mounted. FIG. 14 is a cross-sectional view along line A-A of FIG. 13. FIG. 15 is a perspective view of in the vicinity of the mouth portion of the container.

As illustrated in FIG. 13, the shrink label 45 is composed of the label body 45a and the separation portion 45b, and at least the separation portion 45b is detachably constructed. The label body 45a covers from the vicinity of the shoulder portion 21 to the vicinity of the lower end of the bottom portion 23 of the container body 20. The separation portion 45b covers from the vicinity of the shoulder portion 21 to the top surface of the protective plate 43 beyond the male screw portion 11a.

As illustrated in FIG. 14, the separation portion 45b has the pressing portion 47 which is formed in the inner flange shape toward the center of the protective plate 43 at the upper end. The pressing portion 47, when the shrink label 45 heat shrinks, is a portion formed by inward falling down of the upper edge portion of the shrink label 45, and is held by pushing the upper surface of the outer peripheral portion of the protective plate 43 to the sealing member 12.

As illustrated in FIG. 15, in the separation portion 45b, a pair of first perforations 48a are formed along the vertical direction. By these two first perforations 48a, the separation piece 45c which is formed in a band shape along the vertical direction is formed in the separation portion 45b. The upper end of the separation piece 45c may be provided with the projecting knob portion 45d, as necessary. Further, the separation portion 45b is connected to the upper end of the label body 45a through the second perforation 48b. The separation portion 45b is connected to the upper end of the label body 45a through the second perforation 48b. The separation portion 45b grows separable with regard to the label body 45a by cutting of the second perforation 48b.

Figure 16A:
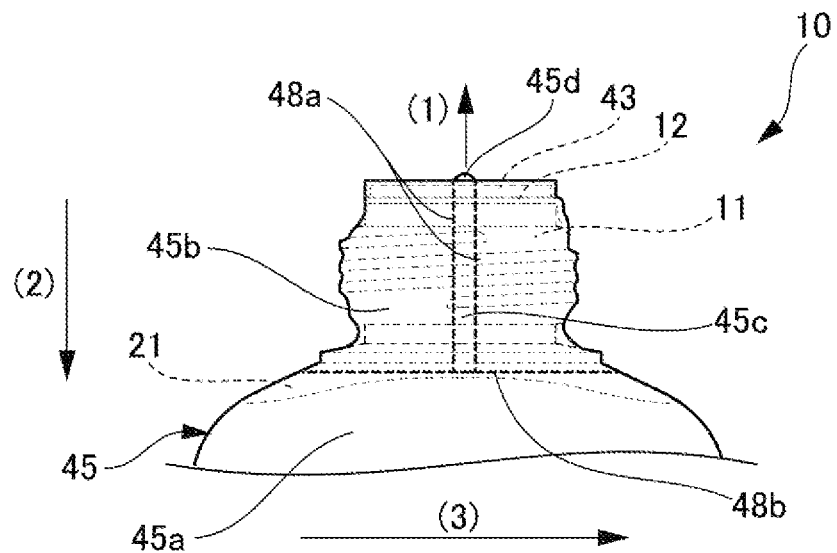
FIG. 16A is a front view of the top portion of the container before peeling off the separating portion.
Figure 16B:
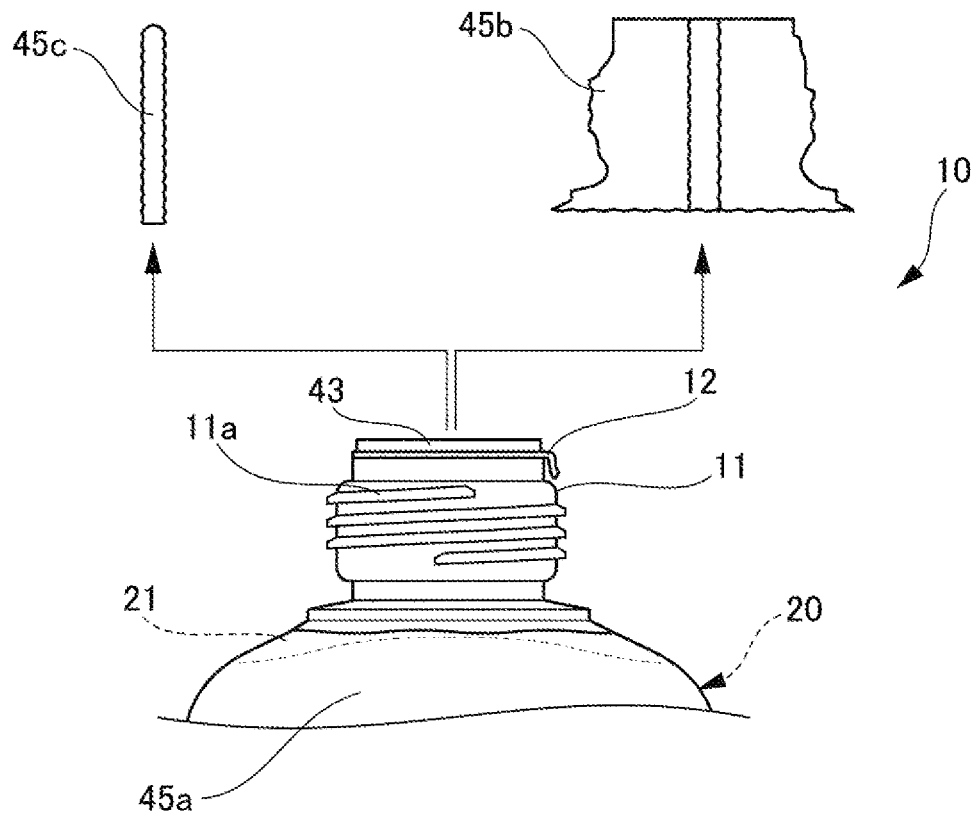
FIG. 16B is a front view of the top portion of the container after peeling off the separation portion.

A method for repairing a punctured tire shall be described with reference to FIG. 16 and FIG. 17, using the container 10 described above. The container 10 provided in a vehicle storage space (for example, cargo) is taken out, as illustrated in FIG. 16A, the upper end of the separation piece 45c is lifted by picking the knob portion 45d (arrow (1)), the first perforation 48a is cut by pulling down the separation piece 45c (arrow (2)). Next, the separation portion 45b is stripped in the circumferential direction (arrow (3)), while cutting the second perforation 48b. Then, as illustrated in FIG. 5B, separation piece 45c and separation portion 45b are separated from the label body 45a (peeled from the mouth portion 11), the male screw portion 11a and the protective plate 43 are completely exposed.

Figure 17A:
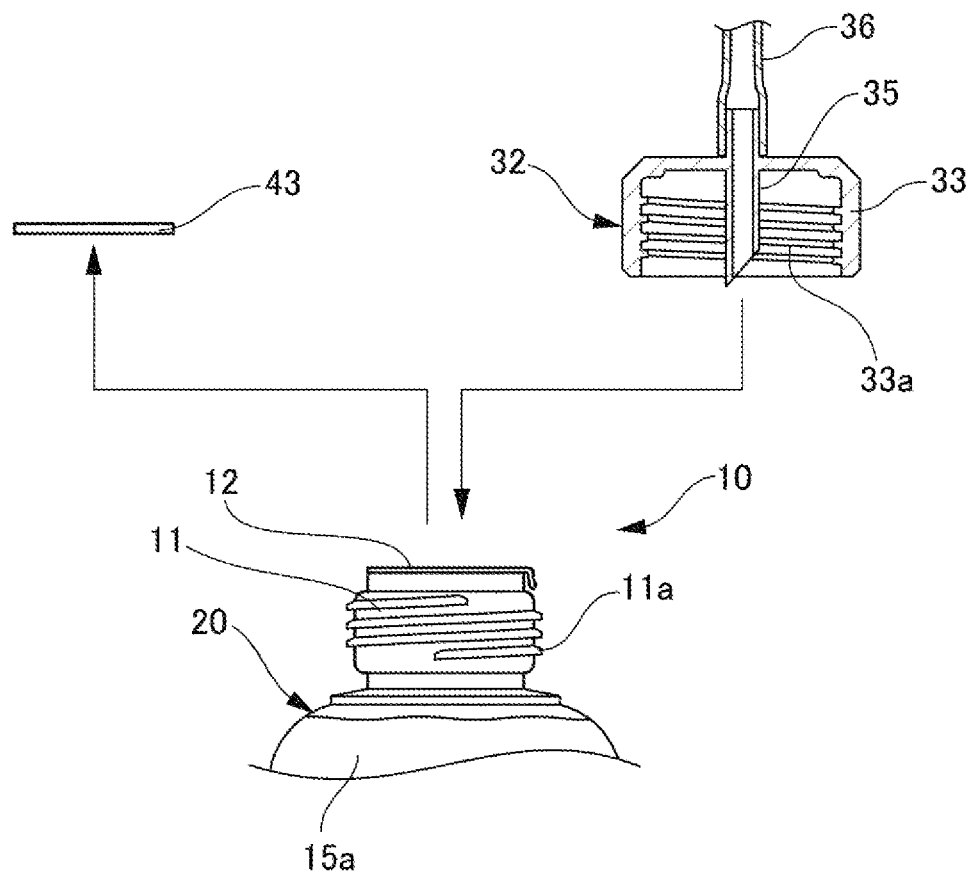
FIG. 17A is a side view of the mouth portion before mounting the lead cap.

Next, as illustrated in FIG. 17A, the protective plate 43 is removed from the top surface of the mouth portion 11, and instead the lead cap 32 is mounted to the mouth portion 11. The lead cap 32 has the fitting portion 33 which can be fitted to the mouth portion 11, and the lead pipe 35 penetrating the center of the fitting portion 33. The fitting portion 33 has the female screw portion 33a screwed into the male screw portion 11a of the mouth portion 11. At the end of the downstream side of the lead pipe 35, the injection hose 36 is connected.

Figure 17B:
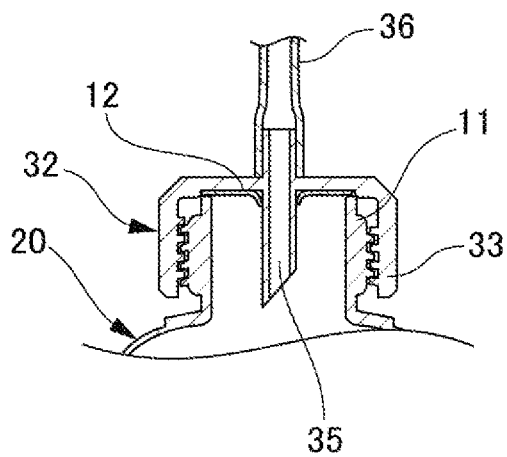
FIG. 17B is a cross-sectional view of the mouth portion after mounting the lead cap.

The user screws the fitting portion 33 into the mouth portion 11, and mounts the lead cap 32 to the container body 20. In this case, the sealing member 12, as illustrated in FIG. 17B, is broken by the tip of the lead pipe 35 to be inserted into the mouth portion 11. By this, the inside and the outside of the container body 20 are communicated by the lead pipe 35. Further, since the top surface of the mouth portion 11 is sealed by the fitting portion 33, there is no fear that the puncture repair agent 14 (refer to FIG. 3) leaks in the vicinity of the mouth portion 11.

Then, in the embodiment 1, by performing the same procedure as illustrated in FIG. 9 and FIG. 10, it is possible to complete the puncture repair.

The effect of the container 10 of the above described embodiments shall be described. In the sealed structure of the container 10, the mouth portion 11 is sealed by the sealing member 12. Further, the sealing member 12 is thin and easy to tear, but is protected by the protective plate 43, and so there is no fear that it tears in contact with other articles in a luggage room or the like. In addition, since the protective plate 43 is held by the shrink label 45, there is no fear that it moves relative to the sealing member 12. Therefore, without using an expensive cap with large mass at all, it is possible to configure the sealing structure of the mouth portion 11, using just the thin and cheap film material or sheet material. By this, the weight reduction and the simplification of the container 10 can be achieved, and as well the materials cost can be reduced.

According to the container 10 of the present embodiment 2, by reducing the weight and simplify the sealing structure, contribution to further weight reduction of the vehicle, further expansion of the storage space and reduction of the environmental load is possible, and furthermore, the cost reduction can be achieved.

In addition, in the present embodiment 2, when repairing a punctured tire 31, the sealing member 12 can be easily broken with the lead pipe 35 of the lead cap 32.

Figure 18:
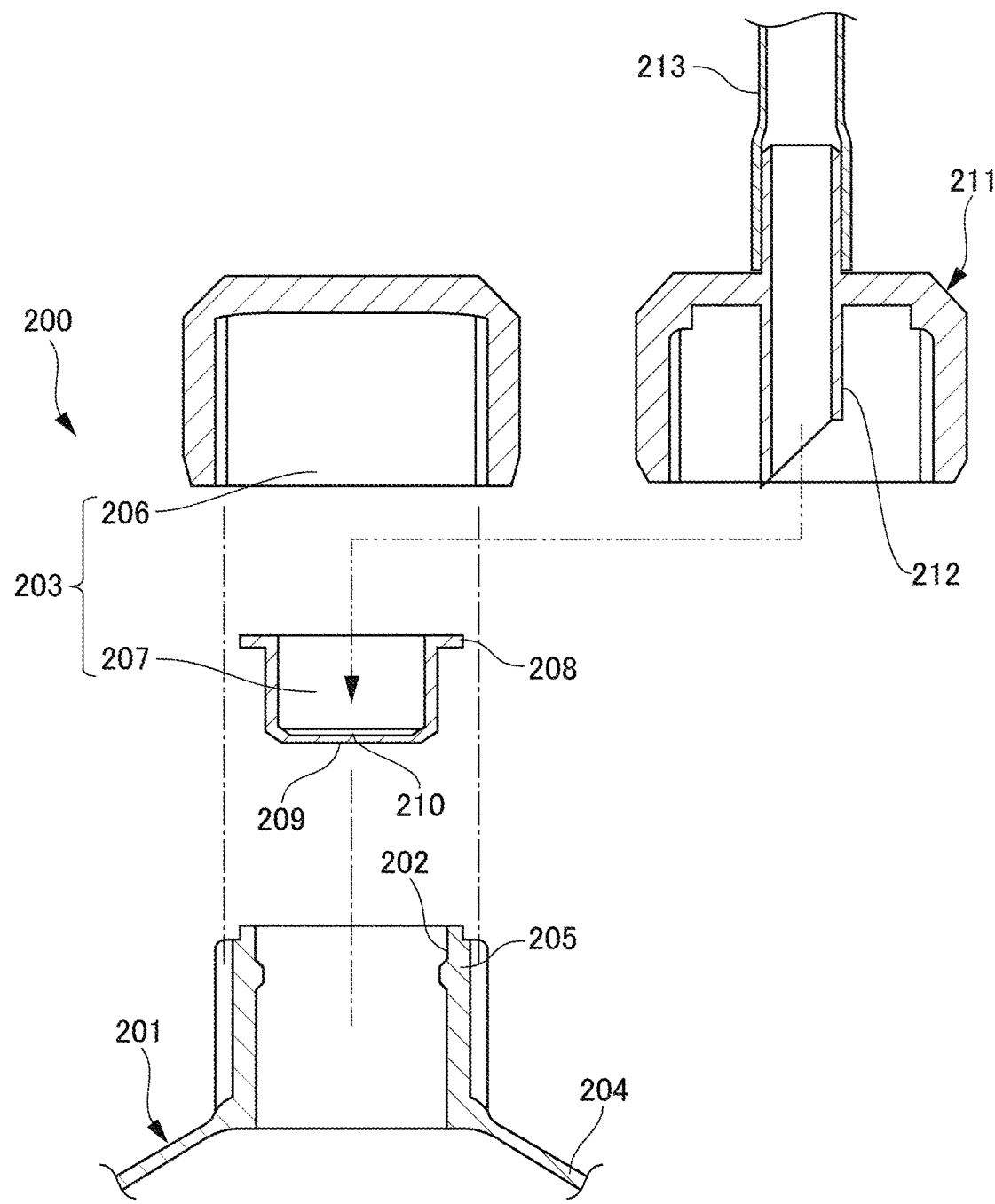
FIG. 18 is a diagram for explaining the basic configuration of a conventional container.
Figure 19A:
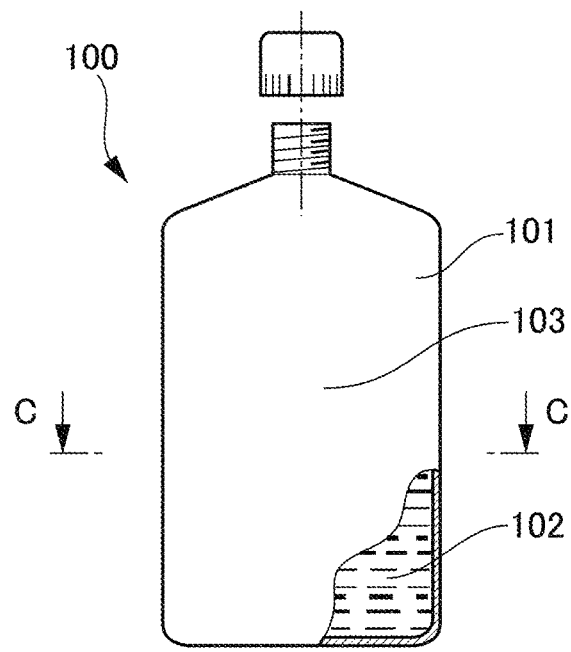
FIG. 19A is a front view.
Figure 19B:
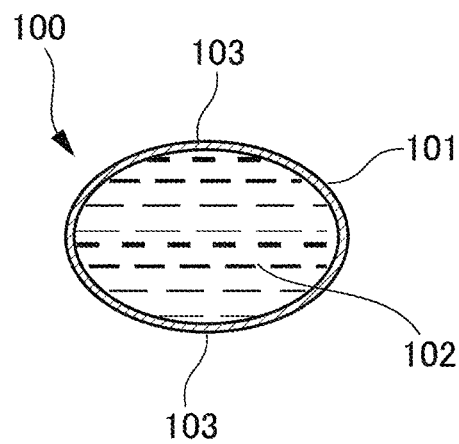
FIG. 19B is a cross-sectional view taken along line C-C in FIG. 19A.

By the way, FIG. 18 illustrates a conventional container 200. As illustrated in FIG. 18, the container 200 has a bottle-shaped container body 201 in which a sealing agent (puncture repair agent) can be accommodated, and a closing means 203 for closing an outlet mouth 202 of the container body 201. The container body 201 has a cylindrical barrel portion 204, and a small-diameter neck portion 205 which forms the outlet mouth 202 provided at the upper end of the barrel portion 204.

The closing means 203 is composed of an outer cap 206 to be screwed detachably to the neck portion 205, and an inner cap 207 for closing the outlet mouth 202. The inner cap 207 has a flange portion 208 formed at the upper end, a closing plate portion 209 formed at the lower end, and a breaking communication portion 210 formed in the closing plate portion 209.

In the container 200, the inner cap 207 is fitted into the outlet mouth 202, and as well the outer cap 206 is screwed to the outer peripheral surface of the neck portion 205 so as to sandwich the flange portion 208 with the neck 205. By this, the outlet mouth 202 is sealed with the inner cap 207, and the container 200 can be stored in the storage space of the vehicle in a state that the inner cap 207 is protected with the outer cap 206.

On the other hand, when the tire is punctured, the outer cap 206 is removed from the neck portion 205, and instead the lead cap 211 is screwed to the neck portion 205. The lead cap 211 is a cap for taking out the sealing agent from the container body 201, and has a sharpened tip tube portion 212 which can be inserted into the neck portion 205. When the lead cap 211 is screwed to the neck portion 205, the sharpened tip tube portion 212 breaks the breaking communication portion 210. By this, a supply pipe 213 which is connected to the tire and the container body 201 are communicated through the sharpened tip tube portion 212.

In the container 200 composed of such a configuration, an inside plug made of a synthetic resin is fitted into the mouth portion, and when repairing the puncture, the breaking communication portion 210 in the bottom portion of the inside plug is broken with the lead pipe, and so it is necessary to break the stiff inside cap bottom portion, a disadvantage of poor workability occurs.

In this point, in the present embodiment, since the thin sealing member 12 can be easily broken by in the lead pipe 35, the workability of the puncture repair is improved.

In addition, the shrink label 45 that functions as a label is also used as a shrink film for holding the protective plate 43, it is possible to obtain the holding function of holding the protective plate 43 and the label function in a single film material. As a result, it is possible to achieve further weight reduction and simplification of the container 10.

As above, the present invention has been described with reference to the embodiments, but the scope of the present invention is of course not limited to the scope in the above described embodiments. It is apparent to those skilled in the art that various modifications or improvements can be added to the above embodiments. In addition, it is apparent from the description of the appended claims that the embodiments added with such modifications or improvements can be included in the technical scope of the present invention.

For example, in the embodiment 2, the shrink label was used as a shrink film, but the shrink film according to the present invention is not particularly limited to the shrink label, and as long as it covers at least the mouth portion and can hold the protective plate, any size and shape are possible.

REFERENCE SIGNS LIST

10 . . . container, 11 . . . mouth portion, 12 . . . sealing member, 14 . . . puncture repair agent, 20 . . . container body, 20a . . . first layer (inner layer), 20c . . . third layer (intermediate layer), 20e . . . fifth layer (outer layer), 20f . . . sixth layer (outer layer), 21 . . . shoulder portion, 22 . . . barrel portion, 23 . . . bottom portion, 25 . . . narrow portion, 26 . . . wide portion, 27 . . . pressing recess portion, 31 . . . tire, 32 . . . lead means (lead cap), 33 . . . fitting portion, 35 . . . lead pipe, D1 . . . major diameter, D2 . . . minor diameter, t1 . . . wall thickness at center portion, t3 . . . wall thickness at both ends in height direction, 43 . . . protective plate, 45 . . . shrink label, 45a . . . label body, 45b . . . separation portion, 45c . . . separation piece, 45d . . . knob portion, 47 . . . pressing portion, 48a . . . first perforation, 48b . . . second perforation

The invention claimed is:

1. A container of a puncture repair agent, comprising:
a bottomed cylindrical container body to store the puncture repair agent; and
a mouth portion provided on the container body, from which the puncture repair agent is pushed out by pressing the container body,
wherein the container body is hollow molded into a flat shape and comprises a shoulder portion connected to a lower end of the mouth portion, a barrel portion connected to a lower end of the shoulder portion, and a bottom portion closing a lower end of the barrel portion,
wherein the barrel portion comprises a pair of narrow portions facing each other in a major axis direction, and a pair of wide portions facing each other in a minor axis direction,
wherein each wide portion of the pair of wide portions is provided with a pressing recessed portion having a concave curved surface shape in a side view, the pressing recessed portion capable of being elastically deformed and further recessed in a concave curved surface shape toward inside of the barrel portion,
wherein each wide portion of the pair of wide portions is set such that a wall thickness at a central portion of each wide portion of the pair of wide portions is larger than a wall thickness at both ends within the pressing recessed portion of each wide portion of the pair of wide portions in a circumferential direction orthogonal to a height direction,
wherein the wall thickness of the barrel portion gradually increases in thickness from the ends to the central portion of each of the pressing recessed portions along the circumferential direction orthogonal to the height direction, and
wherein each wide portion of the pair of wide portions is set such that the wall thickness at the central portion of each wide portion of the pair of wide portions is larger than a wall thickness at both ends within the pressing recessed portion of each wide portion of the pair of wide portions in the height direction.

2. The container according to claim 1, wherein each wide portion of the pair of wide portions is set such that the wall thickness at the central portion of each wide portion of the pair of wide portions is 1.2 to 1.6 times of the wall thickness at both ends in the circumferential direction orthogonal to the height direction of each wide portion of the pair of wide portions.

3. The container according to claim 1, wherein each wide portion of the pair of wide portions is set such that the wall thickness at the central portion of each wide portion of the pair of wide portions is 1.2 to 1.6 times of the wall thickness at both ends in the height direction of each wide portion of the pair of wide portions.

4. The container according to claim 1, wherein the container body has a multi-layered structure of at least three layers comprising an inner layer, an intermediate layer and an outer layer, the intermediate layer comprising a gas barrier resin.

5. The container according to claim 4, wherein the gas barrier resin is an ethylene-vinyl alcohol resin.

6. The container according to claim 1, further comprising:
a seal member bonded to a top surface of the mouth portion to seal the mouth portion; and
a lead cap fitted to the mouth portion, the lead cap provided with an outlet pipe capable of leading out the puncture repair agent from the container body by breaking the sealing member when the lead cap is fitted to the mouth portion.

7. The container according to claim 1, further comprising:
a seal member bonded to a top surface of the mouth portion to seal the mouth portion;
a protective plate detachably superposed to the seal member to protect the seal member;
a shrink film made from a heat-shrinkable synthetic resin film to cover at least the mouth portion and hold the protective plate by heat shrinking; and
a lead cap fitted to the mouth portion in a state that the shrink film is peeled off and the protective plate is removed, the lead cap provided with an outlet pipe capable of leading out the puncture repair agent from the container body by breaking the sealing member when the lead cap is fitted to the mouth portion.

8. The container according to claim 7, wherein the shrink film is a shrink label covering an outer peripheral surface of the mouth portion and an outer peripheral surface of the container body.

9. The container according to claim 7, wherein the shrink film is colored over a range of at least 80% or more of a back surface thereof, and has an ultraviolet transmittance less than 50%.

10. The container according to claim 1, wherein the wall thickness of the barrel portion gradually increases in thickness from the ends to the central portion of that pressing recessed portion along the height direction within one of the pressing recessed portions in the height direction.

* * * * *